(12) United States Patent  
Smith

(10) Patent No.: US 8,419,207 B2  
(45) Date of Patent: Apr. 16, 2013

(54) PORTABLE LIGHT ASSEMBLY

(75) Inventor: Glenn Smith, Blue Bay (AU)

(73) Assignee: Golight Pty Limited, New South Wales (AU)

( * ) Notice: Subject to any disclaimer, the term of this patent is extended or adjusted under 35 U.S.C. 154(b) by 34 days.

(21) Appl. No.: 13/119,537

(22) PCT Filed: Sep. 17, 2009

(86) PCT No.: PCT/AU2009/001226  
§ 371 (c)(1),  
(2), (4) Date: May 17, 2011

(87) PCT Pub. No.: WO2010/031121  
PCT Pub. Date: Mar. 25, 2010

(65) Prior Publication Data  
US 2011/0211340 A1   Sep. 1, 2011

(30) Foreign Application Priority Data  
Sep. 18, 2008   (AU) ............................... 2008904852

(51) Int. Cl.  
*F21L 4/04*   (2006.01)  
*F21V 21/22*  (2006.01)

(52) U.S. Cl.  
USPC ............ 362/199; 362/191; 362/427; 362/450

(58) Field of Classification Search .............. 362/186, 362/191, 197, 198, 413, 419, 427, 190, 199, 362/432, 450, 398  
See application file for complete search history.

(56) References Cited

U.S. PATENT DOCUMENTS

| | | | | |
|---|---|---|---|---|
| 2,612,598 A | * | 9/1952 | Berman | 362/199 |
| 3,944,806 A | * | 3/1976 | Jones et al. | 362/191 |
| 4,290,093 A | | 9/1981 | Thompson et al. | |
| 4,586,114 A | * | 4/1986 | Riley | 362/191 |
| 5,012,394 A | * | 4/1991 | Woodward | 362/198 |
| 5,169,226 A | | 12/1992 | Friedman | |
| 5,630,660 A | * | 5/1997 | Chen | 362/183 |
| 5,758,949 A | * | 6/1998 | Van Deursen | 362/186 |
| 6,305,820 B1 | * | 10/2001 | Poon | 362/186 |

(Continued)

FOREIGN PATENT DOCUMENTS

| | | |
|---|---|---|
| DE | 3641908 A1 | 6/1988 |
| EP | 1921273 A1 | 5/2008 |

(Continued)

OTHER PUBLICATIONS

International Search Report dated Nov. 26, 2009.

*Primary Examiner* — Peggy A. Neils  
(74) *Attorney, Agent, or Firm* — Cooper Legal Group, LLC

(57) ABSTRACT

A portable light assembly (200) has a light head (26) adapted to be housed in a protective container (12) and to be withdrawn therefrom when required for use. The light head (26) is attached to a swivel bracket (28) and is connected to a battery (25) also housed in the container. The portable light assembly includes mounting means (18) for supporting the light head (26) at locations in need of illumination. A handle (14) is connected to a lid (20) of the assembly, and the handle has a release member (36) for releasing an extension post arrangement (30, 32) from the protective container. This allows the extension post arrangement (30, 32), lid (20), swivel bracket (28) and light head (26) to be slid upwardly by activating the release member (36) and lifting the handle (14).

17 Claims, 31 Drawing Sheets

U.S. PATENT DOCUMENTS

| | | |
|---|---|---|
| 6,986,590 B1 | 1/2006 | Padden |
| 7,063,444 B2 * | 6/2006 | Lee et al. ............... 362/285 |
| 7,850,329 B2 * | 12/2010 | Henry et al. ............ 362/191 |
| 7,871,177 B1 * | 1/2011 | Hanchett ................. 362/190 |
| 2004/0052073 A1 * | 3/2004 | Chang et al. ............. 362/197 |
| 2007/0159817 A1 * | 7/2007 | Evans et al. ............. 362/191 |

FOREIGN PATENT DOCUMENTS

| | | |
|---|---|---|
| FR | 2770615 A1 | 5/1999 |
| GB | 2305718 A | 4/1997 |
| JP | 2004071318 A | 3/2004 |
| RU | 00057935 | 10/2006 |

* cited by examiner

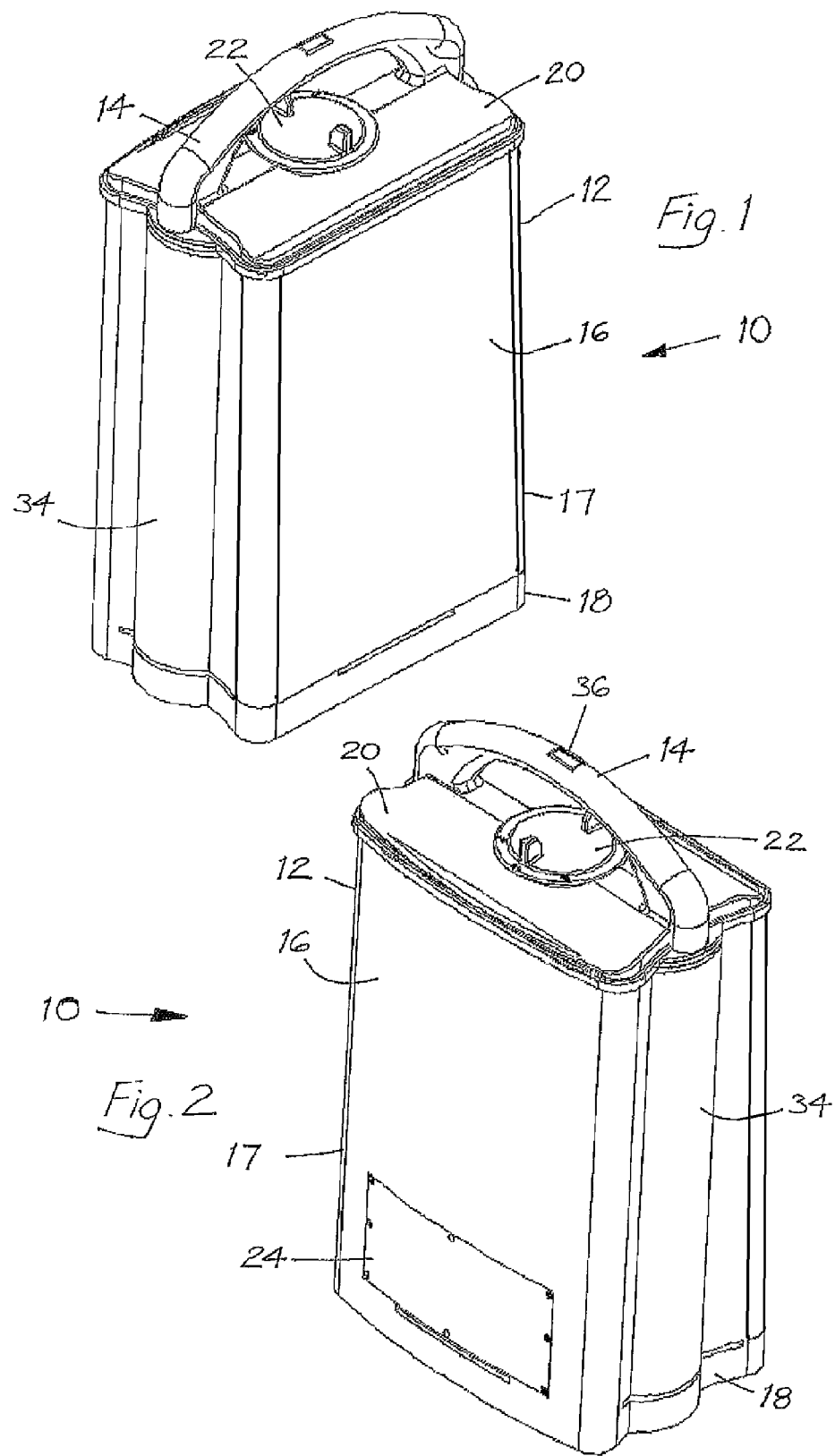

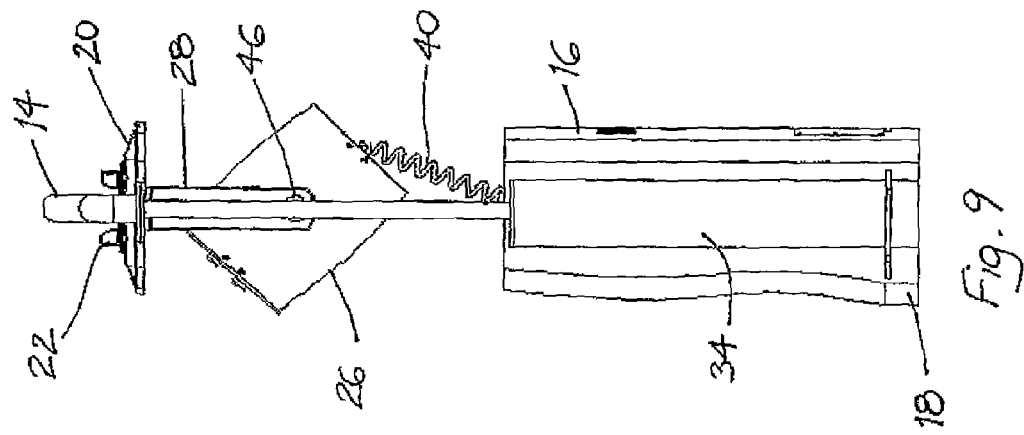
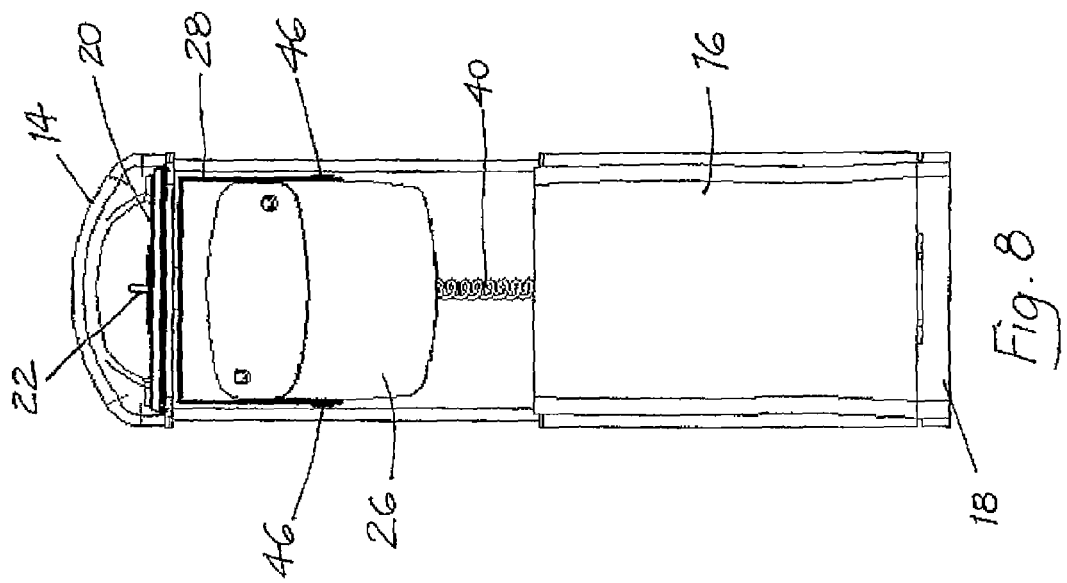

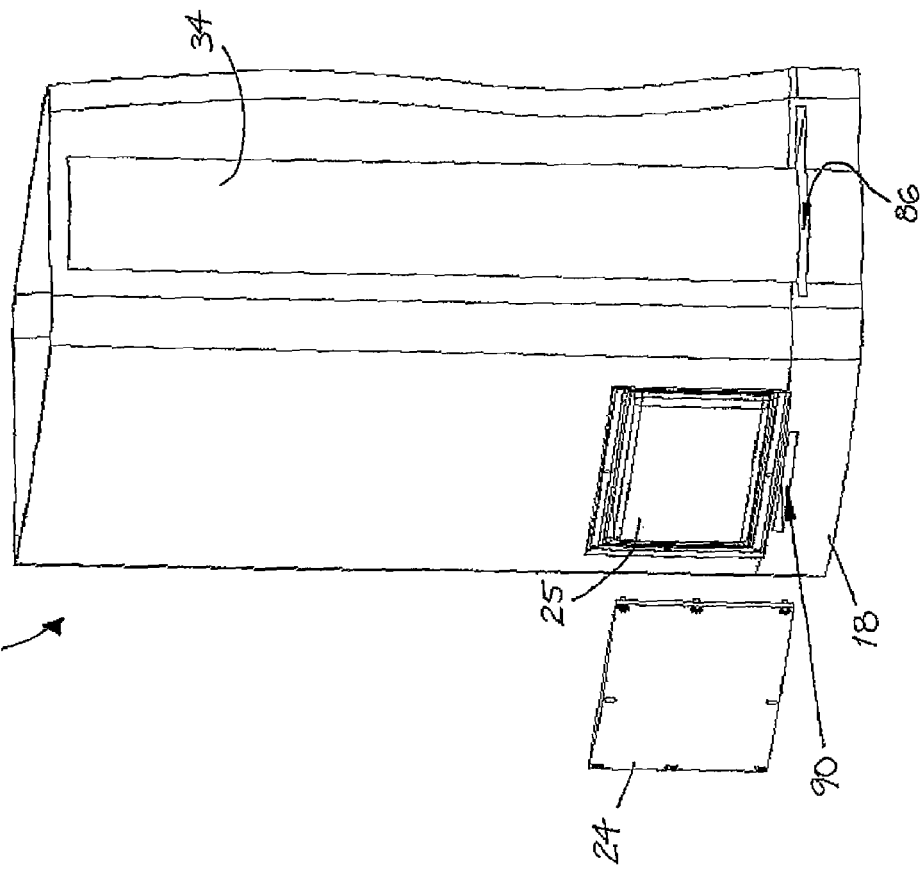
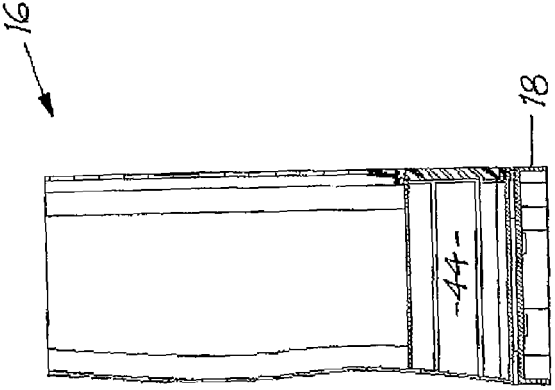

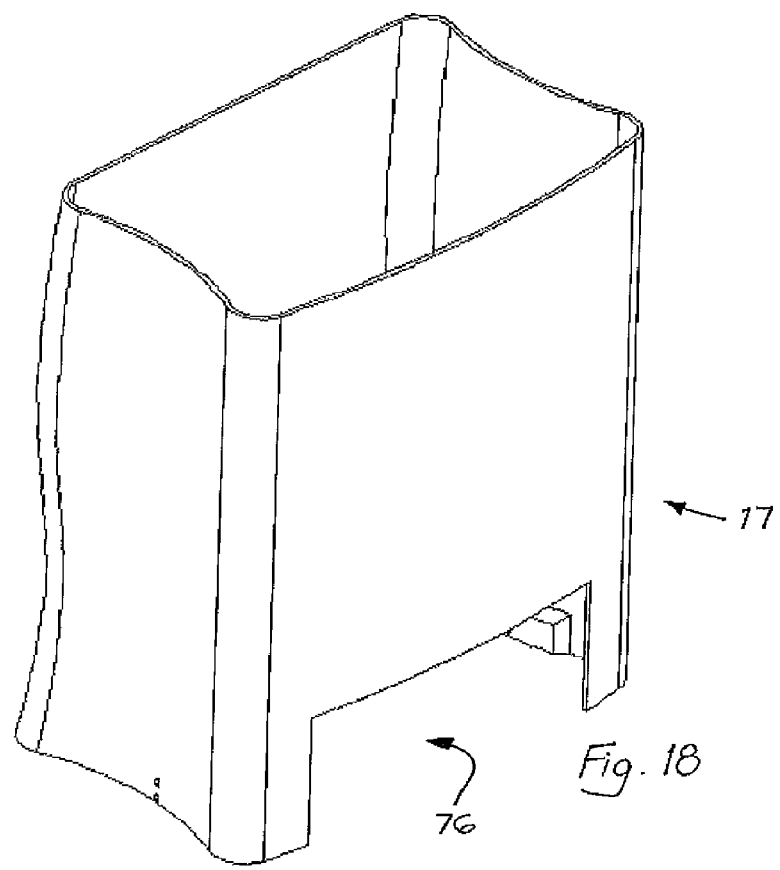
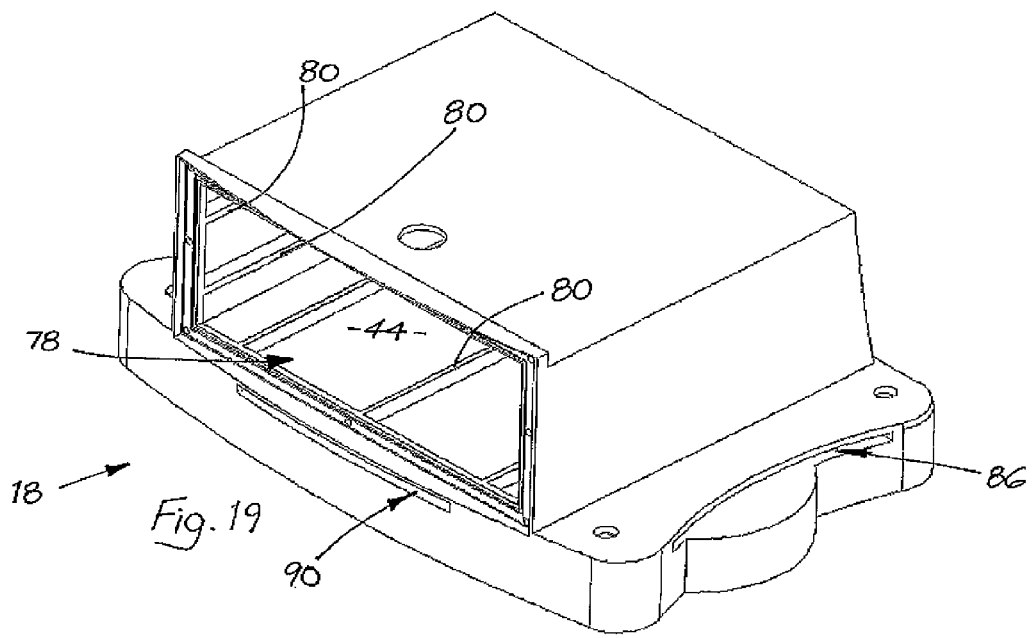

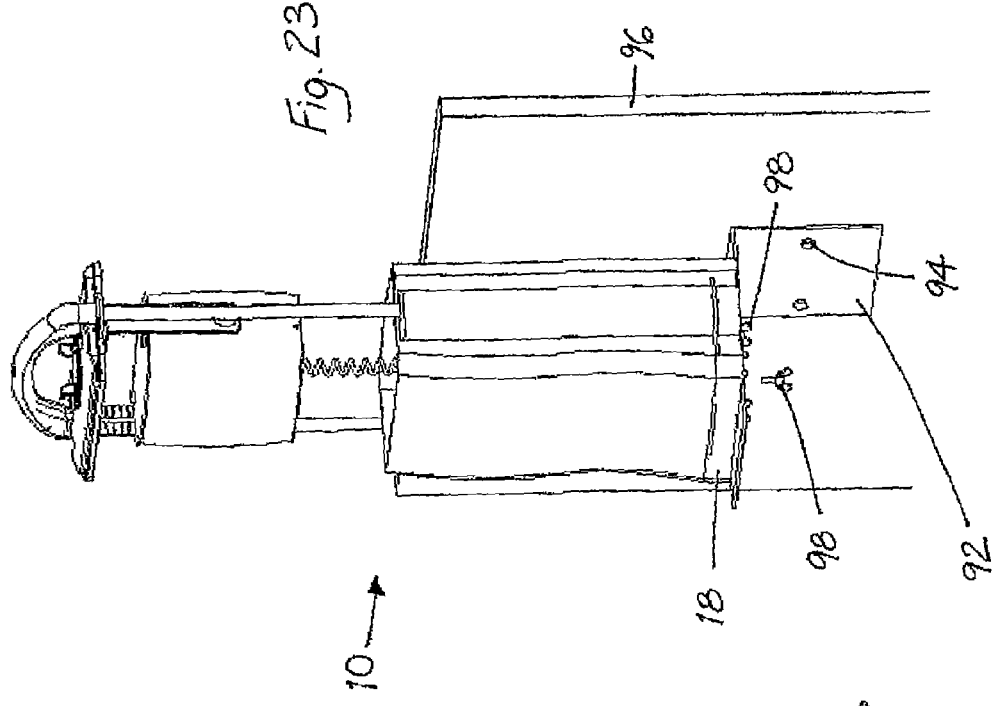
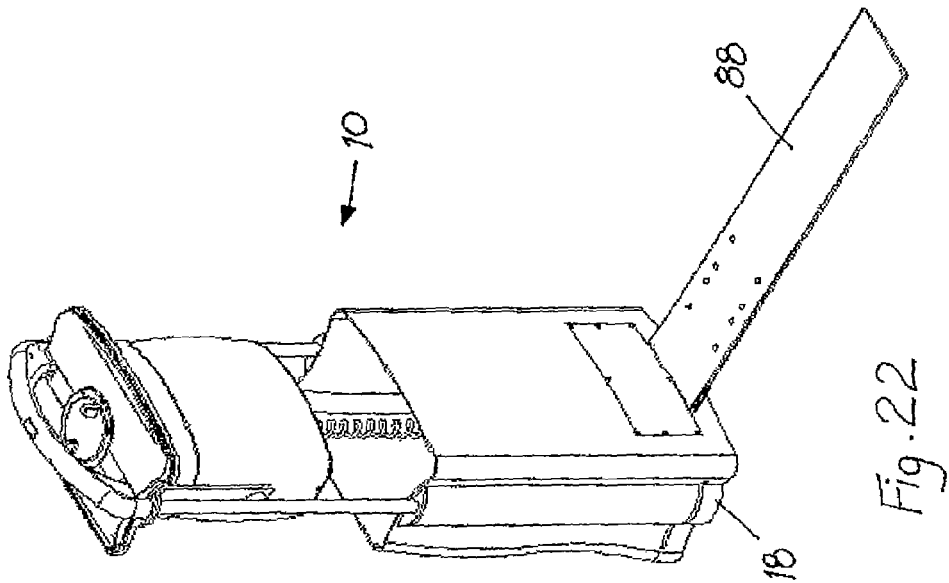

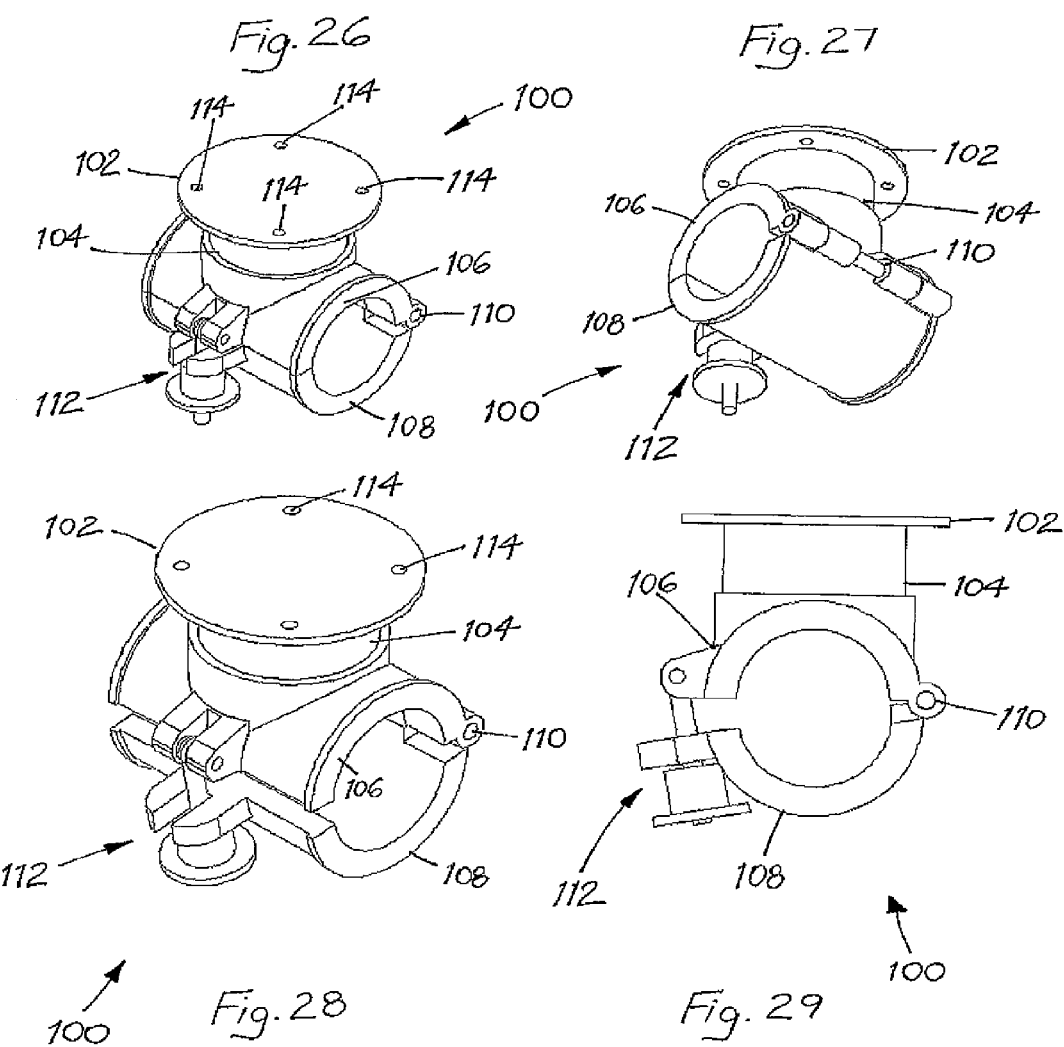

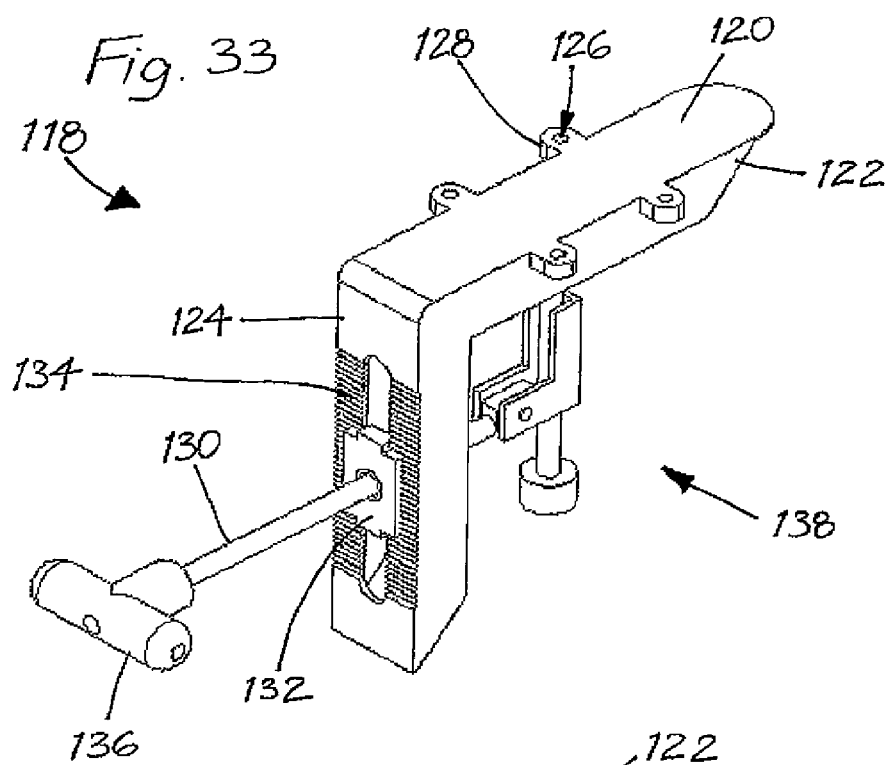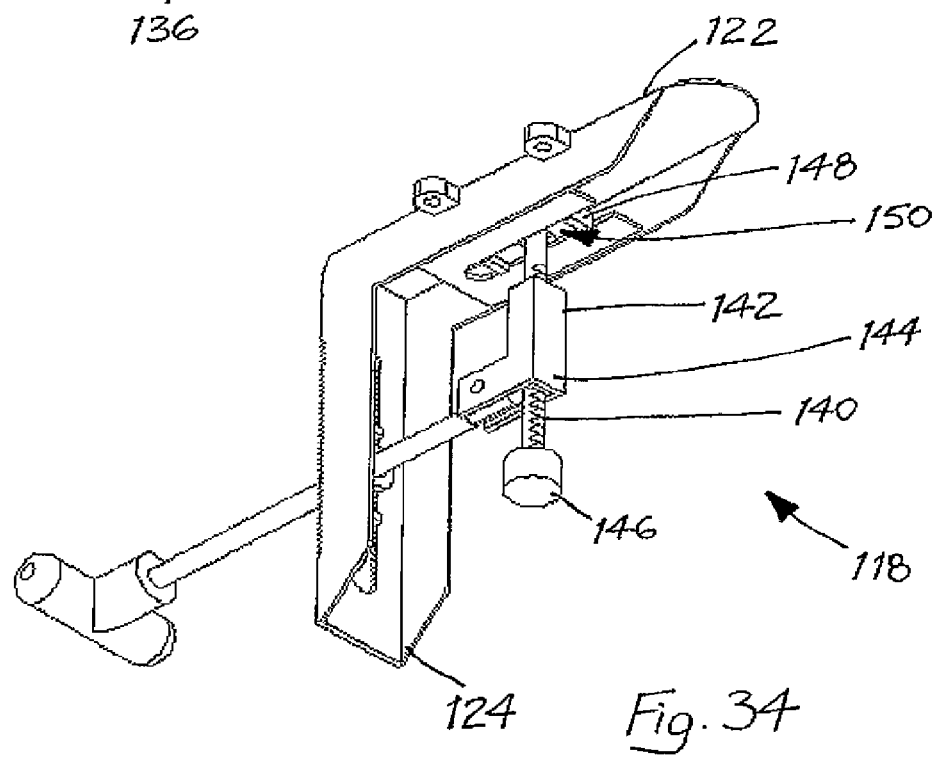

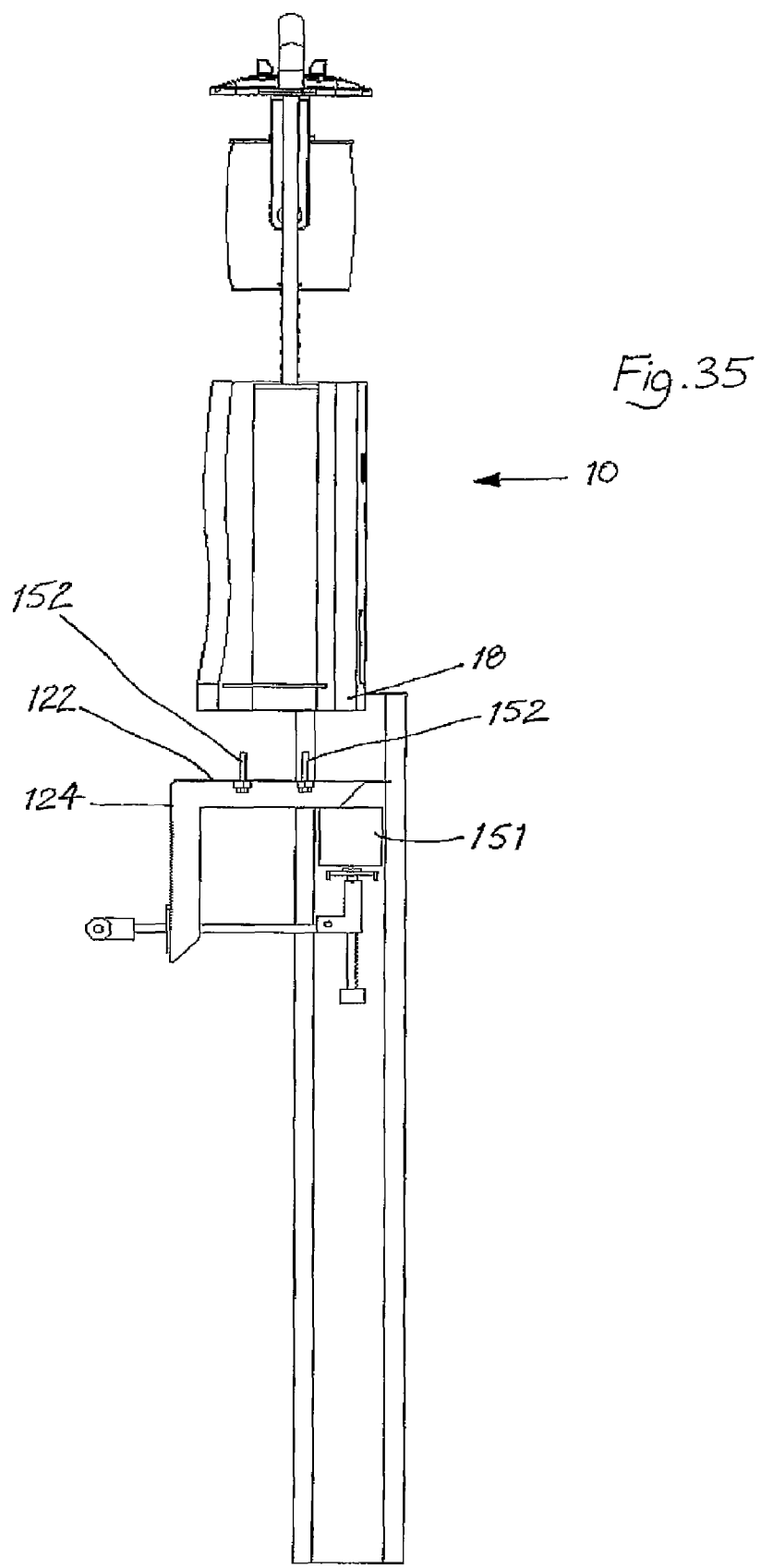

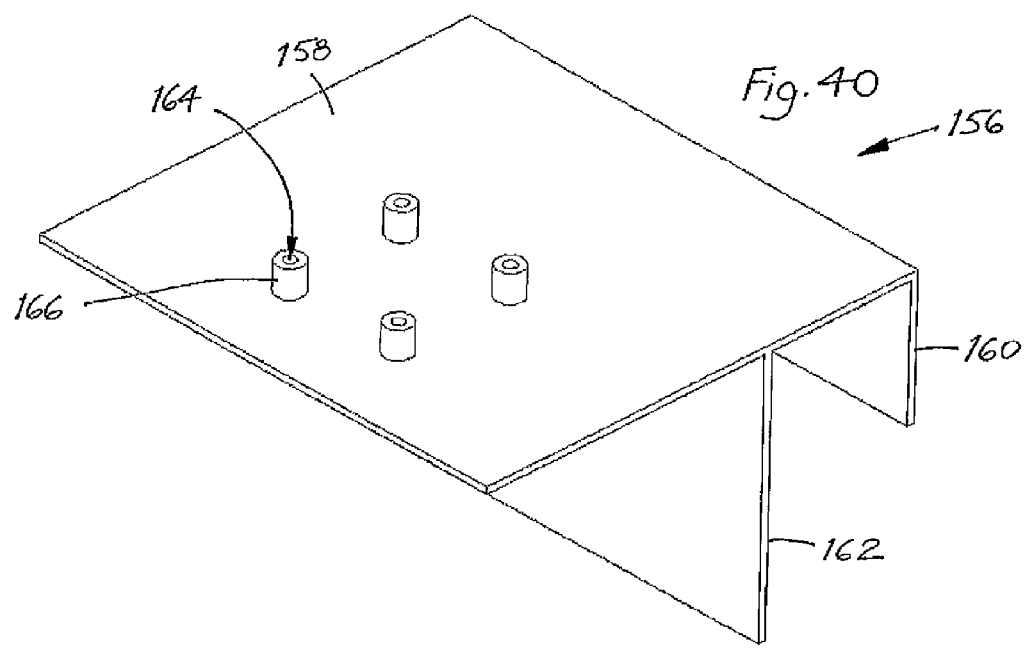
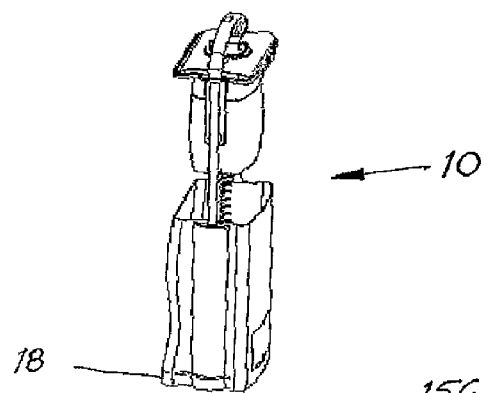
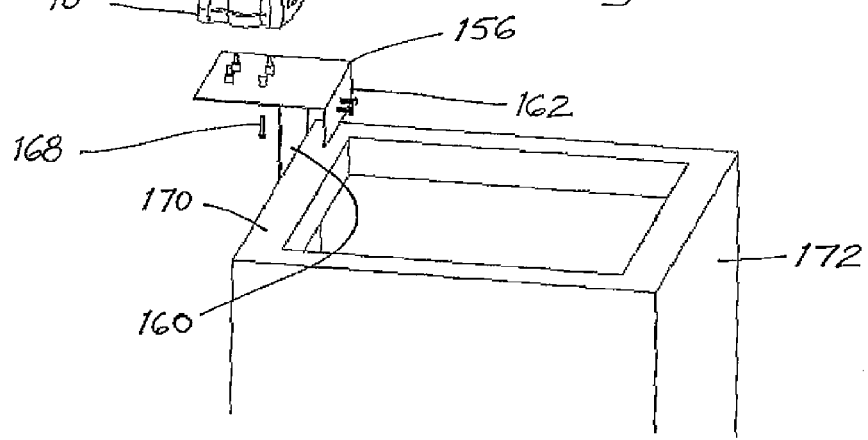

PORTABLE LIGHT ASSEMBLY

TECHNICAL FIELD

The present invention relates to portable lighting. In one particular aspect, the invention relates to a portable light assembly that has a light head which is housed in a protective container when not in use and can be withdrawn from the container when required for use whilst maintaining power connection to a battery also housed in the container. In another particular aspect, the invention relates to a portable light assembly that has a light head which may also be connected to an external power generator or other external source of direct power and can be supported by various mounting assemblies at desired locations in need of illumination.

BACKGROUND ART

There are many worksites where work is conducted at night or in poorly illuminated areas, and that therefore require suitable lighting. In many cases, the worksites, such as those relating to construction, mining, recreational or emergency services, need one or more lights to be located in areas that provide the widest possible range of illumination. The lighting required to meet these needs must be portable, easy to transport, powerful and robust. It would also be desirable for such lighting to be readily adapted for mounting to various locations.

DISCLOSURE OF INVENTION

It is an object of the present invention to overcome, or at least substantially ameliorate, the disadvantages and shortcomings of the prior art, or at least provide a useful alternative.

According to the present invention, there is provided a portable light assembly comprising a light head adapted to be housed in a protective container and to be withdrawn therefrom when required for use, the light head adapted to be connected to a battery also housed in the container, the portable light assembly including mounting means for supporting the light head at locations in need of illumination.

Preferably, the mounting means includes a screw mounting arrangement formed at the underside of the portable light assembly.

It is preferred that the mounting means further includes any one of a mounting plate, mounting bracket, mounting clamp and mounting ring.

BRIEF DESCRIPTION OF THE DRAWINGS

In order that the invention may be more readily understood and put into practical effect, reference will now be made to the accompanying drawings, in which:—

FIG. 1 is a front perspective view of a portable light assembly according to a first preferred embodiment of the invention when in a closed position, the assembly adapted to be connected directly to an internal battery housed within the assembly, FIG. 2 is a rear perspective view of the assembly shown in FIG. 1, FIG. 8 is a front elevational view of the assembly of FIG. 3 when the light head is turned 45° about a horizontal axis relative to the protective container, FIG. 9 is a side elevational view of the assembly shown in FIG. 8, FIG. 16 is a rear perspective view of the body of the protective container isolated from the light head of the assembly of FIGS. 1 to 9, with the lid and handle extension of the container also not shown, FIG. 17 is a sectioned side elevational view of the body shown in FIG. 16, FIG. 18 is a rear perspective view of a hood of the body shown in FIG. 17, FIG. 19 is a rear perspective view of a pedestal of the body shown in FIG. 17, the pedestal including a housing for a battery, FIG. 22 is a rear perspective view of the assembly shown in FIG. 3 with the mounting plate adapted for rear mounting the assembly to an elevated horizontal location, FIG. 23 is a front perspective view of the assembly shown in FIG. 3 with a wall mounting bracket adapted for rear mounting the assembly to an elevated vertical location, such as a wall, FIG. 26 is a front perspective view of a mounting clamp adapted for top mounting the assembly of FIG. 3 to cylindrical, horizontally extending, components of scaffolding or working poles used in the power industry, FIG. 27 is a bottom perspective view of the mounting clamp shown in FIG. 26, FIG. 28 is a front perspective view of the mounting clamp of FIG. 26 with first and second clamp arms slightly opened for receiving a scaffold component, FIG. 29 is an end elevational view of the mounting clamp shown in FIG. 28, FIG. 33 is a front perspective view of an adjustable mounting bracket adapted for top mounting the assembly of FIG. 3 to square cornered, horizontally extending, components of working poles, FIG. 34 is a bottom perspective view of the adjustable mounting bracket shown in FIG. 3, FIG. 35 is a side elevational view of the adjustable mounting bracket shown in FIGS. 33 and 34 received on a square cornered, horizontally extending, component of a working pole, and including bolts for the purpose of mounting the portable light assembly shown in FIG. 3 thereto, FIG. 40 is a front perspective view of a mounting bracket for a work basket or elevating work platform, in which the bracket is adapted for top mounting the assembly of FIG. 3 to a square cornered rim of a basket, FIG. 41 is a side perspective view of the mounting bracket shown in FIG. 40 about to be received on a square cornered rim of a work basket, and including wing nuts or adjustable bolts for the purpose of receiving the bracket on the basket and of top mounting the portable light assembly shown in FIG. 3 thereto.

MODES FOR CARRYING OUT THE INVENTION

Figure 4:
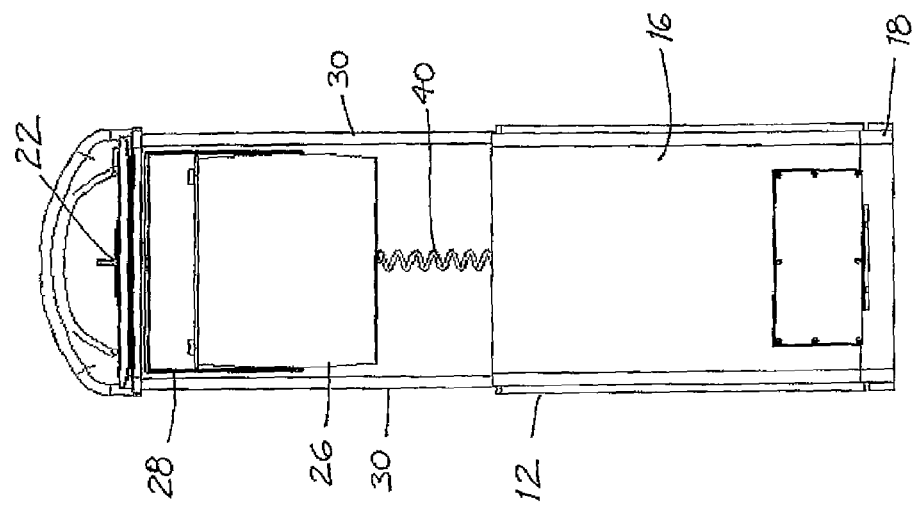
FIG. 4 is a rear elevational view of the assembly shown in FIG. 3.
Figure 3:
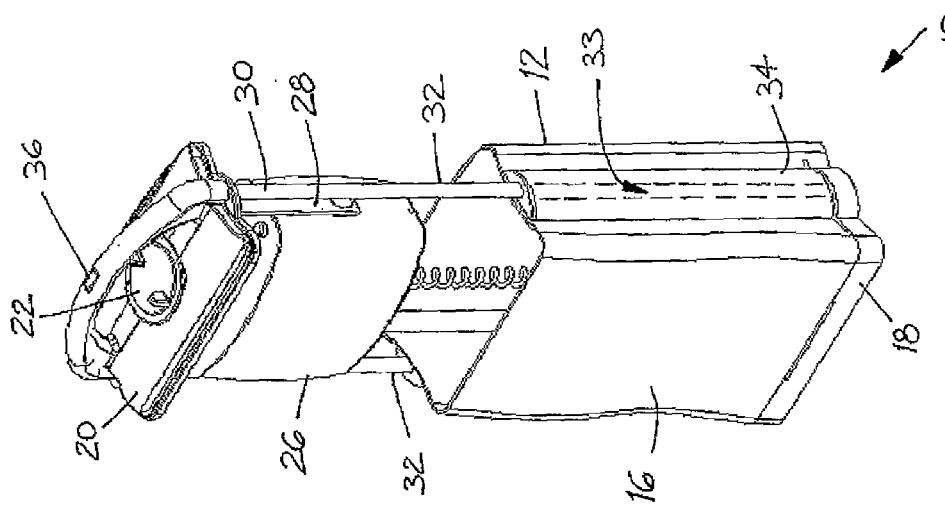
FIG. 3 is a front perspective view of the assembly of FIG. 1 when in an open position to show the light head withdrawn from the body of the protective container, with a lid and handle extension of the container also being withdrawn with the light head.
Figure 5:
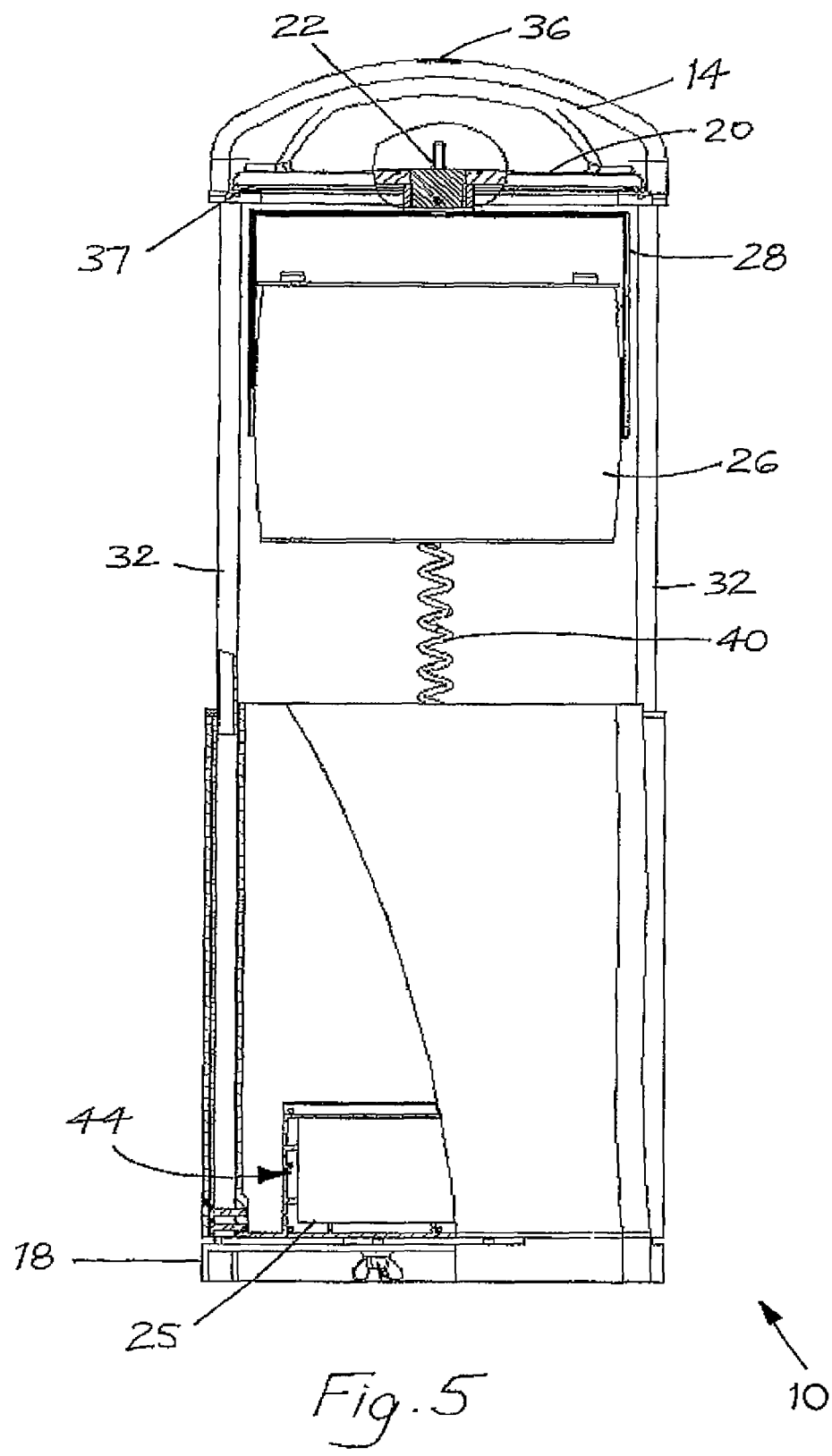
FIG. 5 is a partly sectioned, front elevational view of the assembly shown in FIG. 3.

The portable light assembly 10 is shown in FIGS. 1 and 2 in a closed position, and in FIGS. 3 to 9 in an open position.

FIGS. 1 and 2 show a closed protective container 12 and a handle 14 for the container. There is shown, when the protective container 12 is closed, a body 16 comprising a hood 17 and a pedestal 18, a lid 20, and a rotation switch knob 22. At the rear of the protective container 12 is a door panel 24 for enclosing a battery 25 (shown in FIG. 16) housed in the assembly 10.

Figure 11:
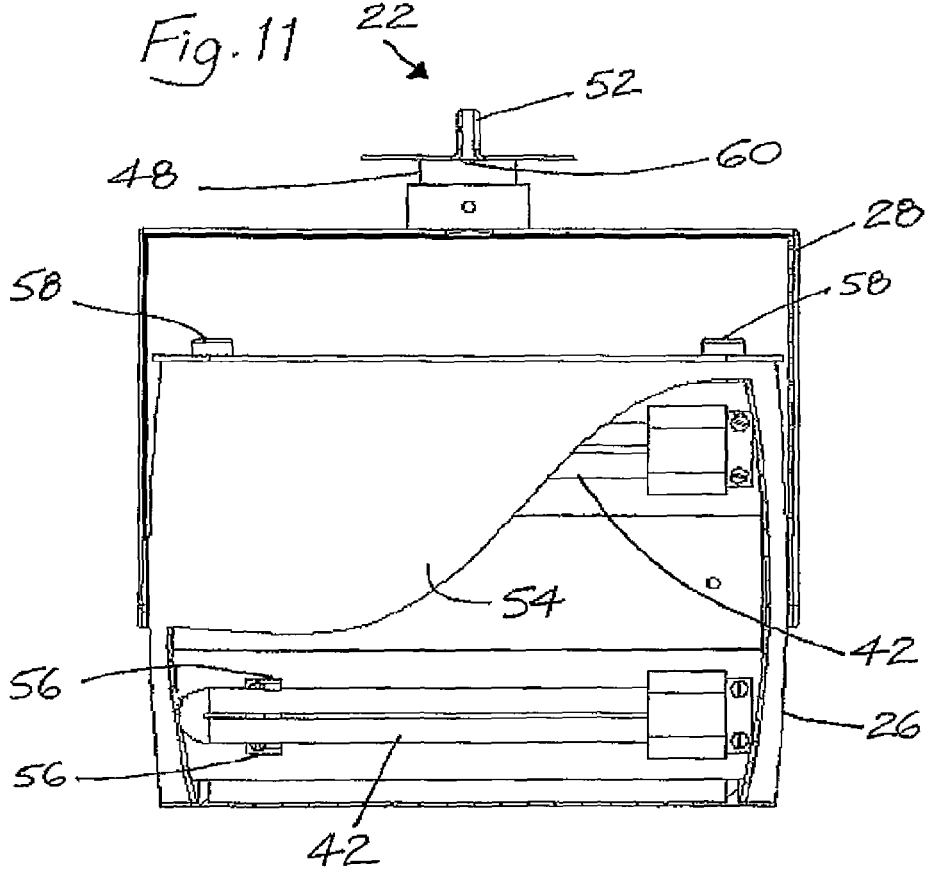
FIG. 11 is a partly sectioned, front elevational view of the light head shown in FIG. 10.
Figure 12:
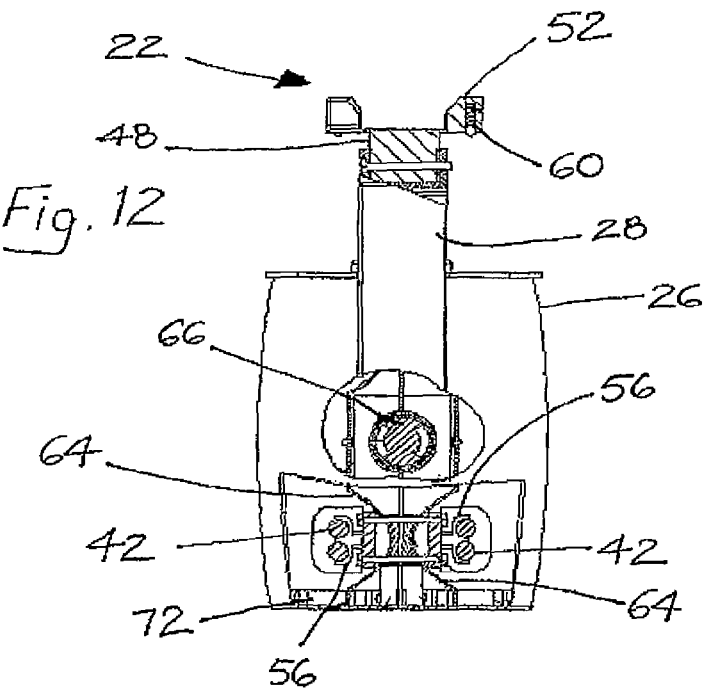
FIG. 12 is a partly sectioned, side elevational view of the light head shown in FIG. 10.
Figure 15:
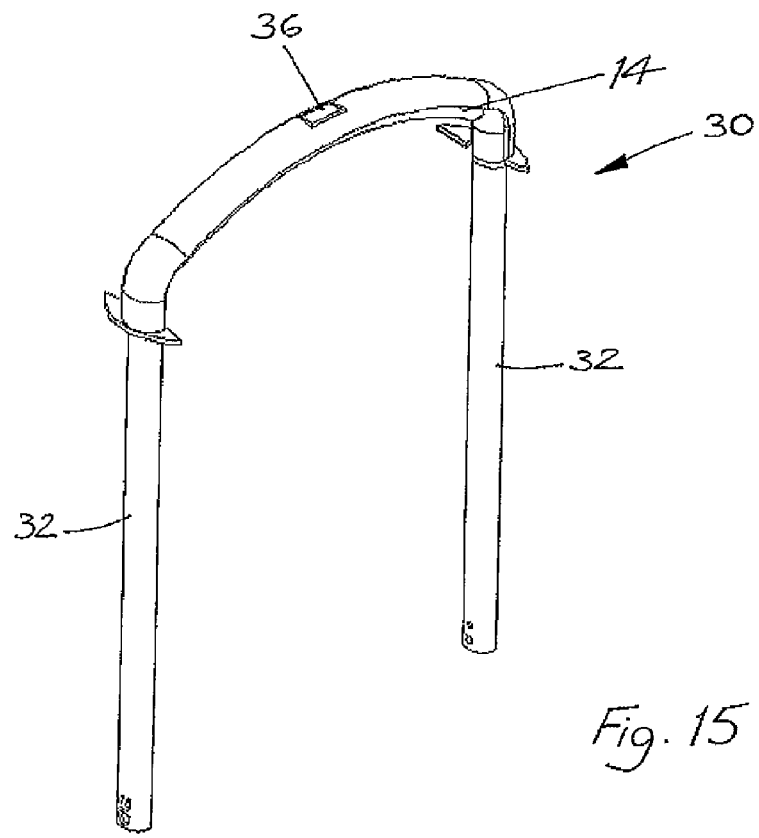
FIG. 15 is a front perspective view of the handle extension of the protective container of the assembly of FIGS. 1 to 9.

FIGS. 3 to 9 show an opened protective container 12 in which a light head 26 and attached swivel bracket 28, together with a handle extension 30 have been withdrawn from the body 16, along with the raising of the lid 20 and the rotation switch knob 22. The handle extension 30 has a plurality of opposed telescopic posts 32 that can slide reciprocatingly through a bore 33 formed in respective guides 34 located at opposed sides of the body 16. A button 36, when pressed, inactivates or releases a sprung catch mechanism 37 and allows the handle extension 30 to be slid upwardly by lifting the handle 14 (see FIG. 15). This also lifts the lid 20 and the light head 26, which is rotatably connected about a horizontal axis to the swivel bracket 28, the swivel bracket 28 being rotatably connected, in turn, about a vertical axis to the rotation switch knob 22 of the lid 20. An extendable electrical cable 40 supplies power from the battery to light tubes 42 (see FIGS. 11 and 12) located inside the light head. The battery is specifically housed within a compartment 44 of the pedestal 18, the compartment being closed to the outside by the door panel 24 (see also FIGS. 16 and 17).

Figure 7:
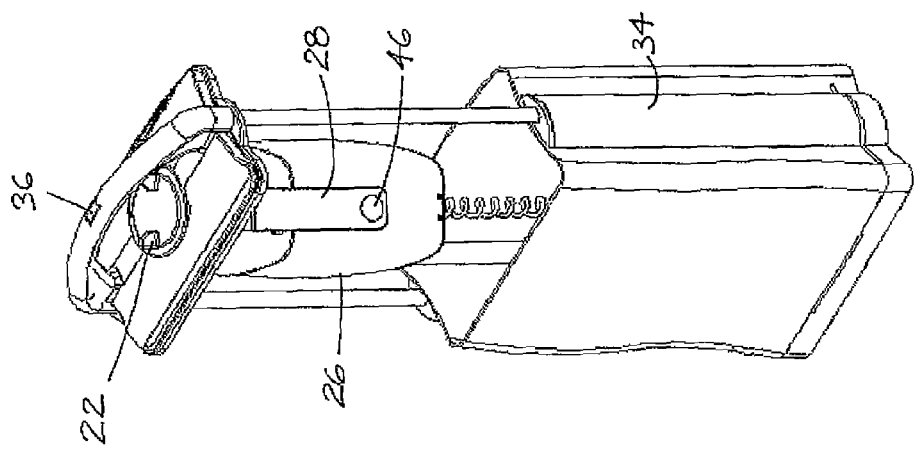
FIG. 7 is a front perspective view of the assembly shown in FIG. 6.
Figure 6:
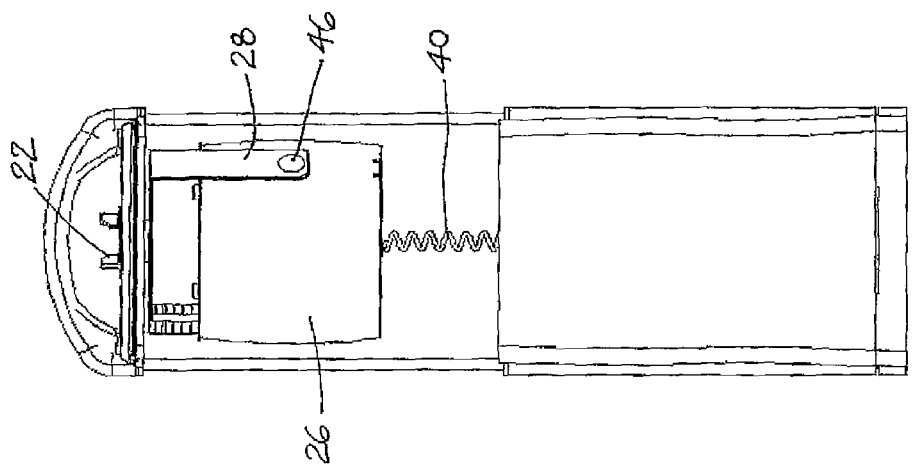
FIG. 6 is a front elevational view of the assembly of FIG. 3 when the light head is turned 45° about a vertical axis relative to the protective container.
Figure 10:
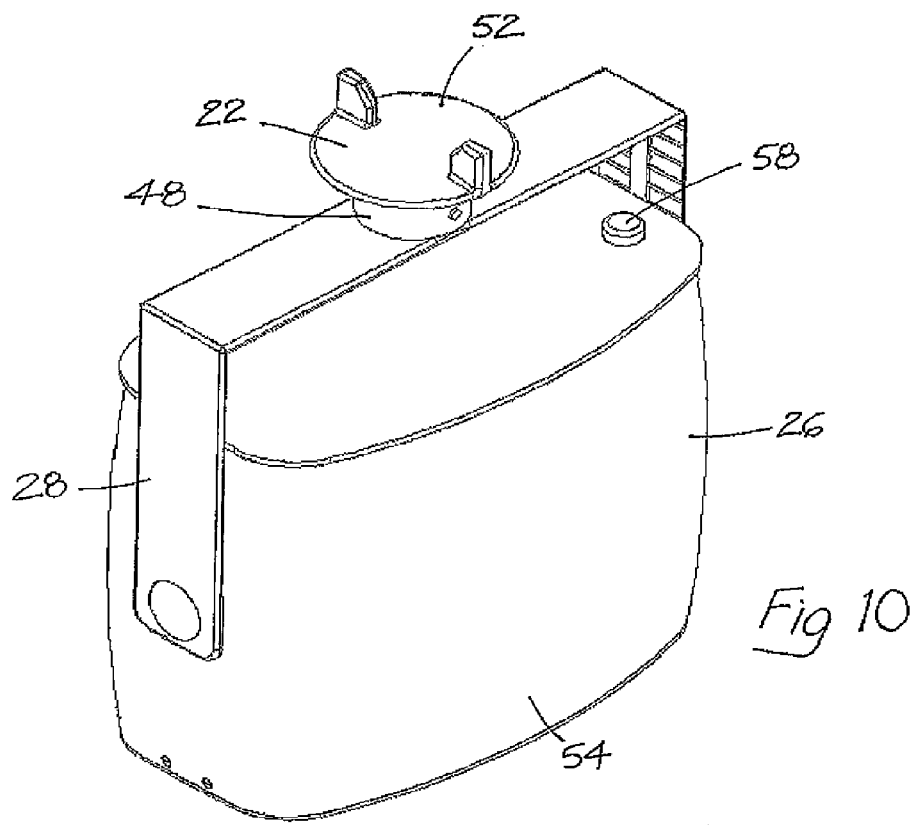
FIG. 10 is a front perspective view of the light head isolated from the protective container of the assembly of FIGS. 1 to 9.
Figure 13:
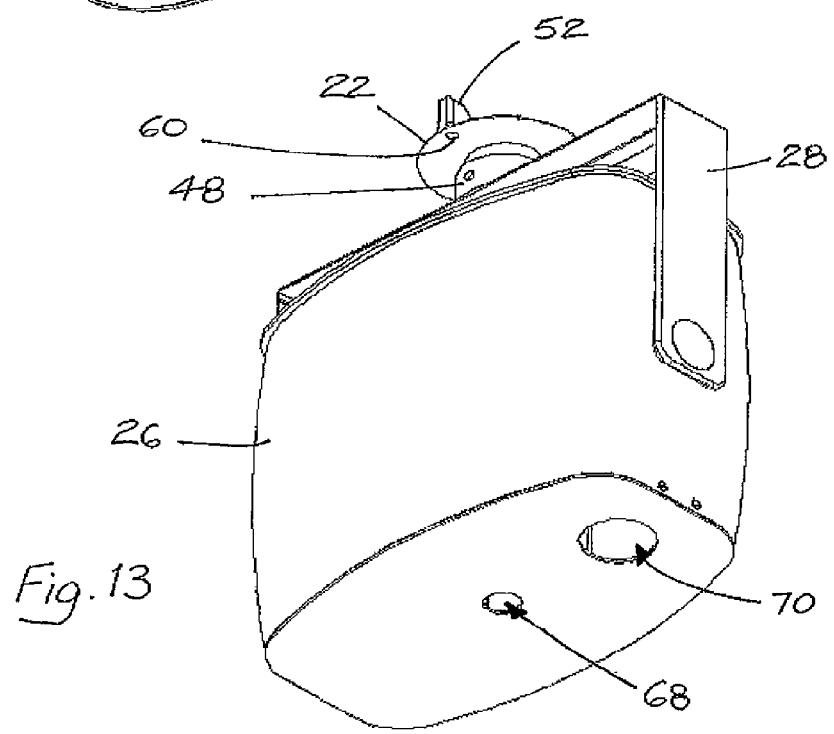
FIG. 13 is a bottom perspective view of the light head shown in FIG. 10.

The light from the light tubes 42 in the light head 26 can be transmitted in a desired horizontal direction by rotating the switch knob 22 about a vertical axis, thereby rotating the swivel bracket 28 and light head 26 about the same vertical axis (see FIGS. 6 and 7).

The light from the light tubes 42 can be transmitted in a desired vertical direction by rotating the light head 26 about a horizontal axis defined by opposed pin assemblies 46 that hold the light head to the swivel bracket 28 (see FIGS. 8 and 9).

Figure 14:
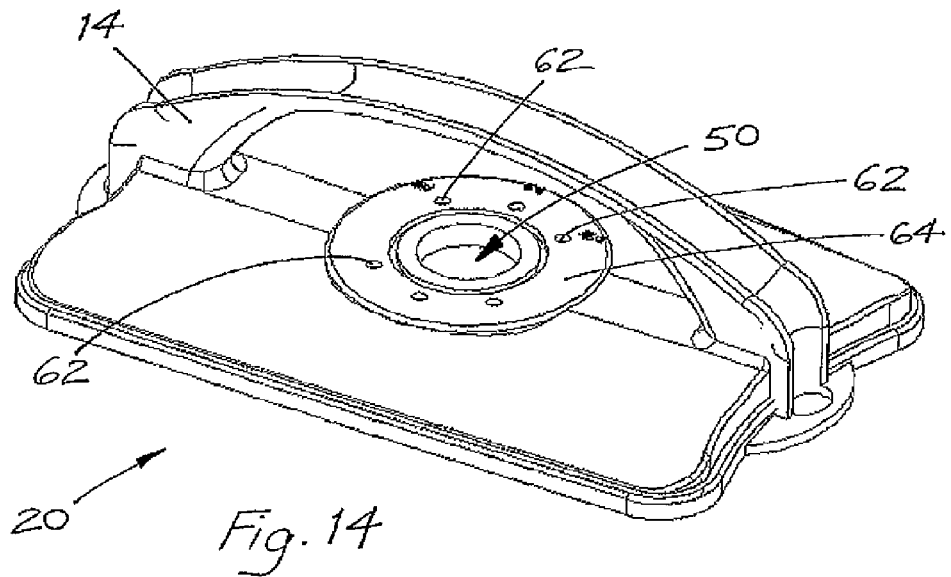
FIG. 14 is a front perspective view of the lid of the protective container of the assembly of FIGS. 1 to 9.

FIGS. 10 to 13 show the light head 26 and attached swivel bracket 28 in isolation. The rotation switch knob 22 is secured to the swivel bracket 28 and has a neck portion 48 that can be fitted within an aperture 50 defined in the lid 20 (see FIG. 14), and a head portion 52 that can be located above the aperture so as to be rotatable by a user. There is a spring and ball assembly 60 in the head portion 52 which can engage a selected one of a plurality of holes 62 formed in a disc 64 surrounding the aperture 50 of the lid 20 (see FIG. 14) to allow a user to select the angle of rotation of the light head 26 about the vertical axis. The light head 26 has a light mask 54 made of glass steel, and houses four light tubes 42 held in place by brackets 56 at opposed sides of the light head 26. There is a pair of on/off switches 58 for controlling the supply of battery power to the light tubes 42 on each side. Light reflection brackets 64 are located behind each light tube 42. There is a charger 66 for the light tubes 42 located centrally in the light head 26, and a battery power access hole 68 for the electrical cable 40 to connect the charger 66 to the battery. There is also an external power access hole 70 for an electrical cable to connect the charger to an external power source if the battery is dead. The base 72 of the light head 26 is weighted with a ballast material to ensure that it does not flip over.

FIG. 18 shows the hood 17 of the body 16, and FIG. 19 shows the pedestal 18 of the body 16. The hood 17 is formed with a cut-out portion 76 to align with an opening 78 of the compartment 44 of the pedestal 18. The compartment 44 has raised ribbing 80 along its inner surfaces to limit heat transfer between the battery and those surfaces.

Figure 20:
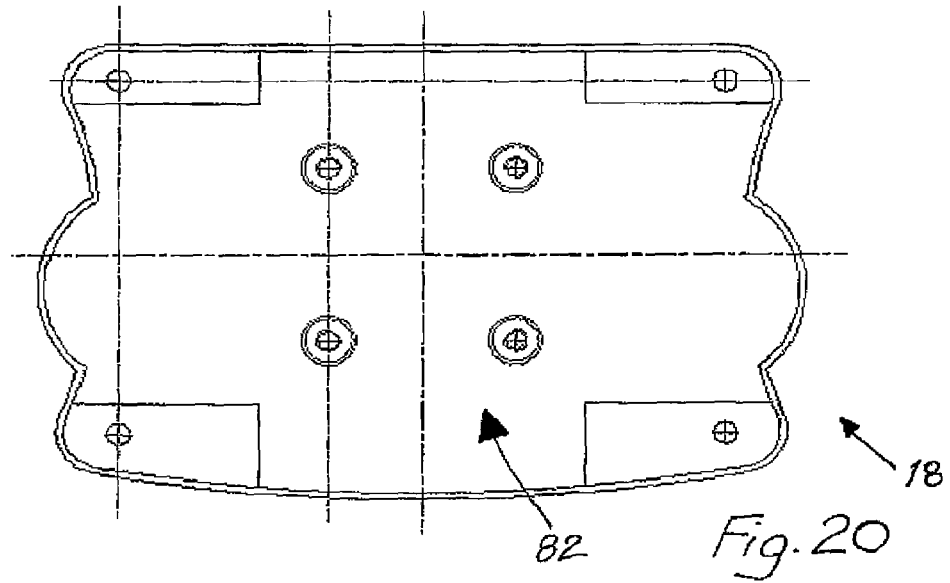
FIG. 20 is a bottom view of the pedestal shown in FIG. 19.

FIG. 20 shows a screw mounting arrangement 82 at the underside of the pedestal. The arrangement 82 is adapted to screwably receive wing nuts or adjustable bolts.

Figure 21:
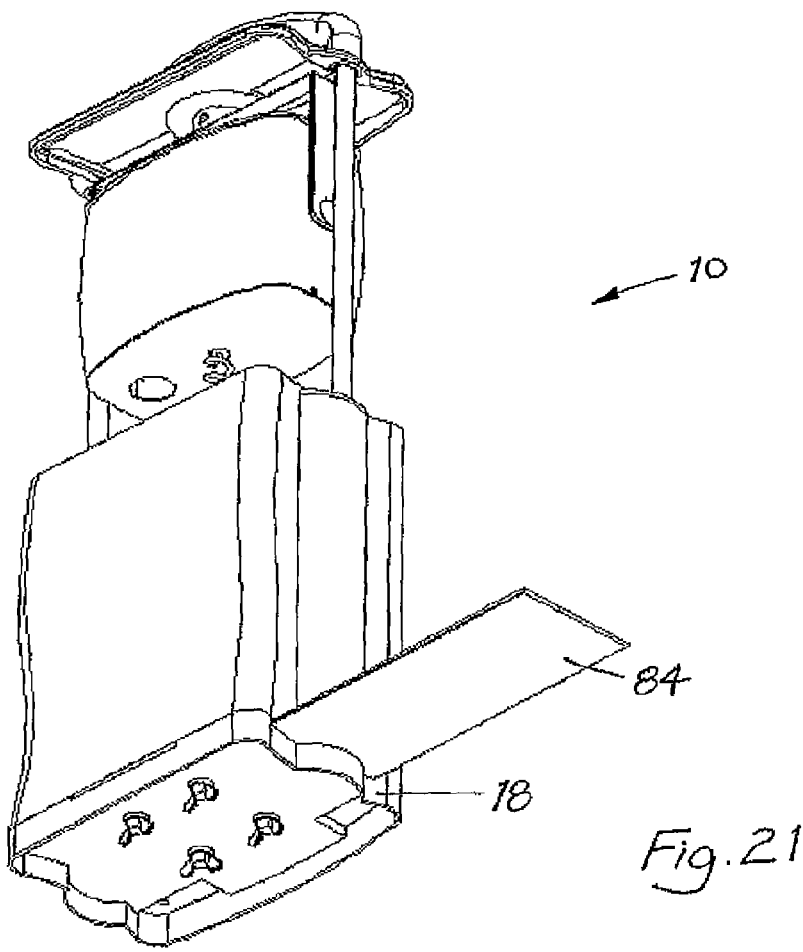
FIG. 21 is a bottom perspective view of the assembly shown in FIG. 3 with a mounting plate adapted for side mounting the assembly to an elevated horizontal location.

FIG. 21 shows a mounting plate 84 arranged within a mounting slot 86 (see FIG. 19) formed in the pedestal 18. The mounting plate 84 is used to side mount the assembly 10 to an elevated horizontal location.

FIG. 22 shows a mounting plate 88 engaged within a mounting slot 90 (see FIG. 19) formed in the pedestal 18. The mounting plate 88 is used to rear mount the assembly 10 to an elevated horizontal location. Side mounting the assembly 10 with the plate 88 is also possible.

Figure 25:
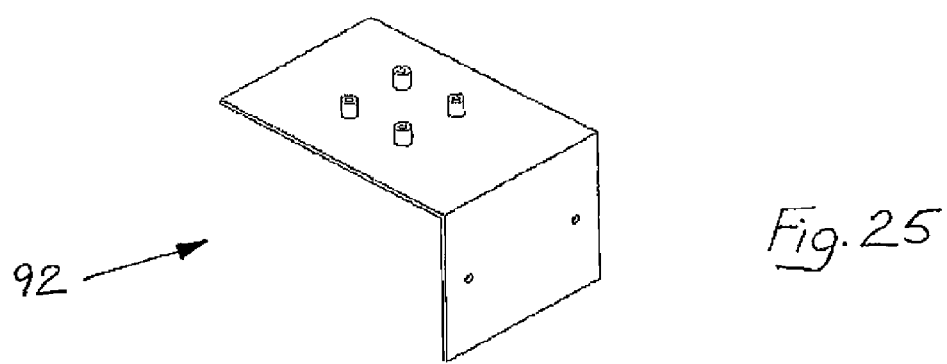
FIG. 25 is a rear perspective view of the mounting bracket shown in FIGS. 23 and 24.

FIG. 23 shows a wall mounting bracket 92 (see isolated bracket 92 in FIG. 25) engaged by bolts 94 to a wall 96 and by wing nuts 98 to the screw mounting arrangement 82 at the underside of the pedestal 18. The assembly 10 is rear mounted to the wall 96. The wing nuts 98 allow for a quick manual action without the need for tools to, say, unscrew bolts.

Figure 24:
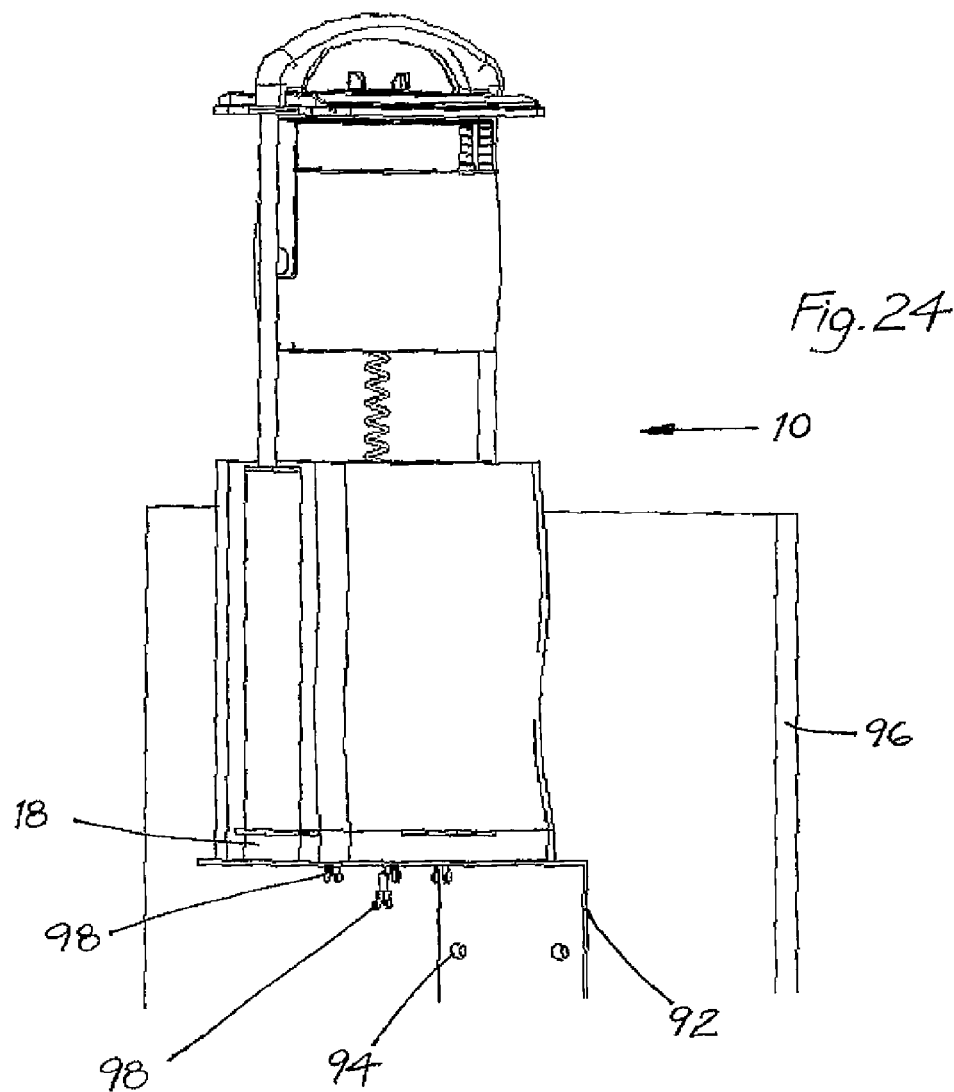
FIG. 24 is a front perspective view of the assembly shown in FIG. 3 with the wall mounting bracket adapted for side mounting the assembly to an elevated vertical location.

FIG. 24 shows the same wall mounting bracket 92 used to side mount the assembly 10 to the wall 96.

Figure 30:
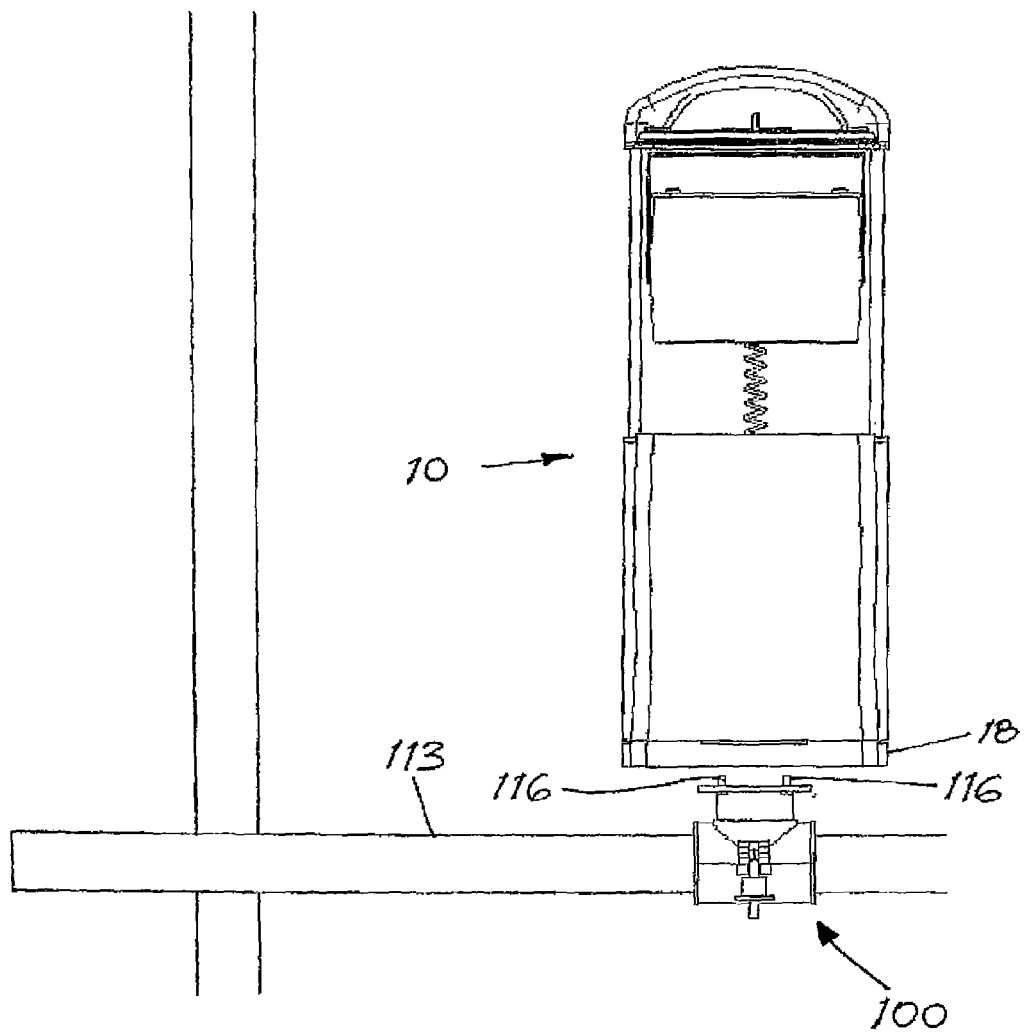
FIG. 30 is a front elevational view of the mounting clamp shown in FIGS. 26 to 29 received on a cylindrical, horizontally extending, component of scaffolding, and including wing nuts for the purpose of top mounting the portable light assembly shown in FIG. 3 thereto.
Figure 31:
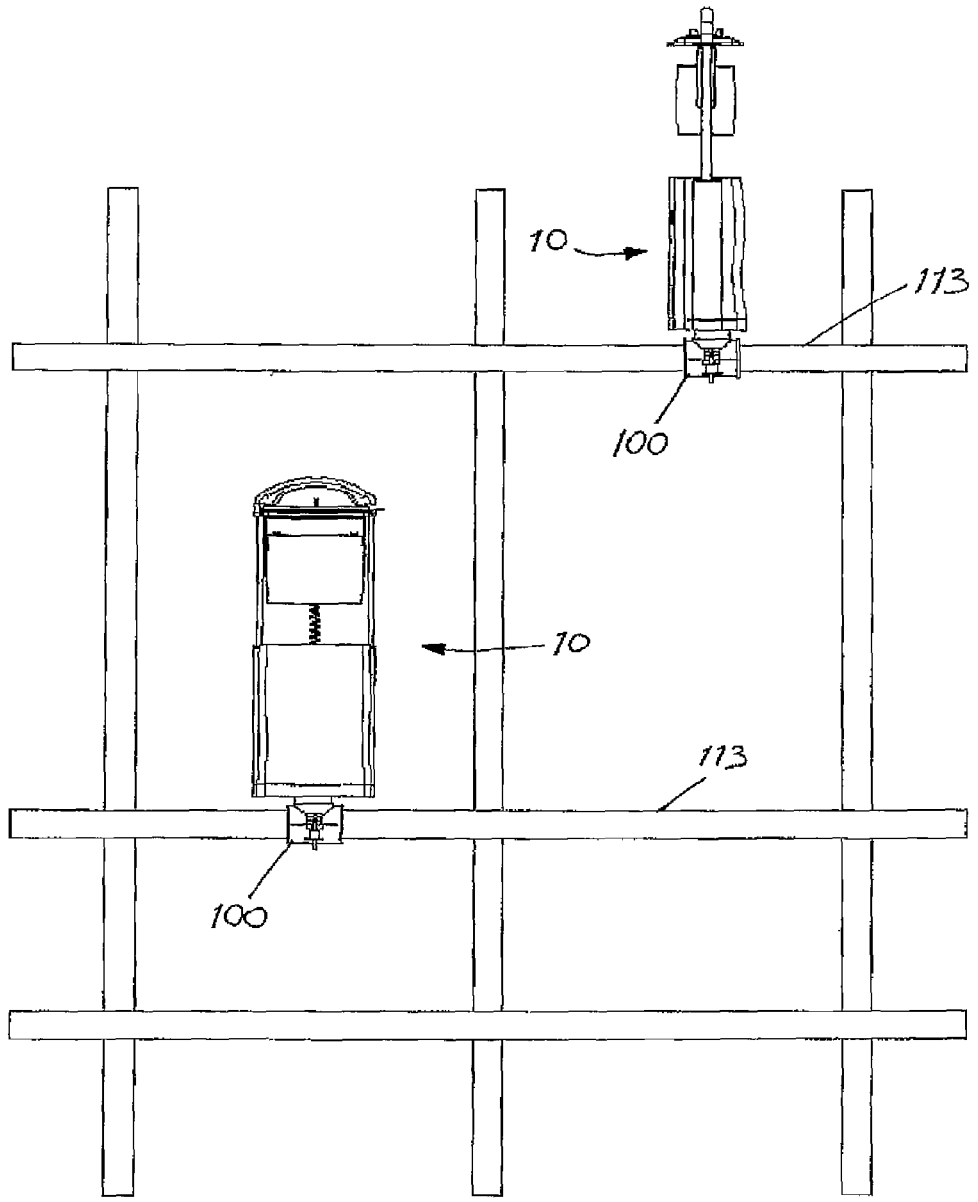
FIG. 31 is a front elevational view of two of the portable light assemblies shown in FIG. 3 top mounted in a front on direction and in a sideways direction, respectively, to scaffolding with the use of the mounting clamp shown in FIGS. 26 to 29.
Figure 32:
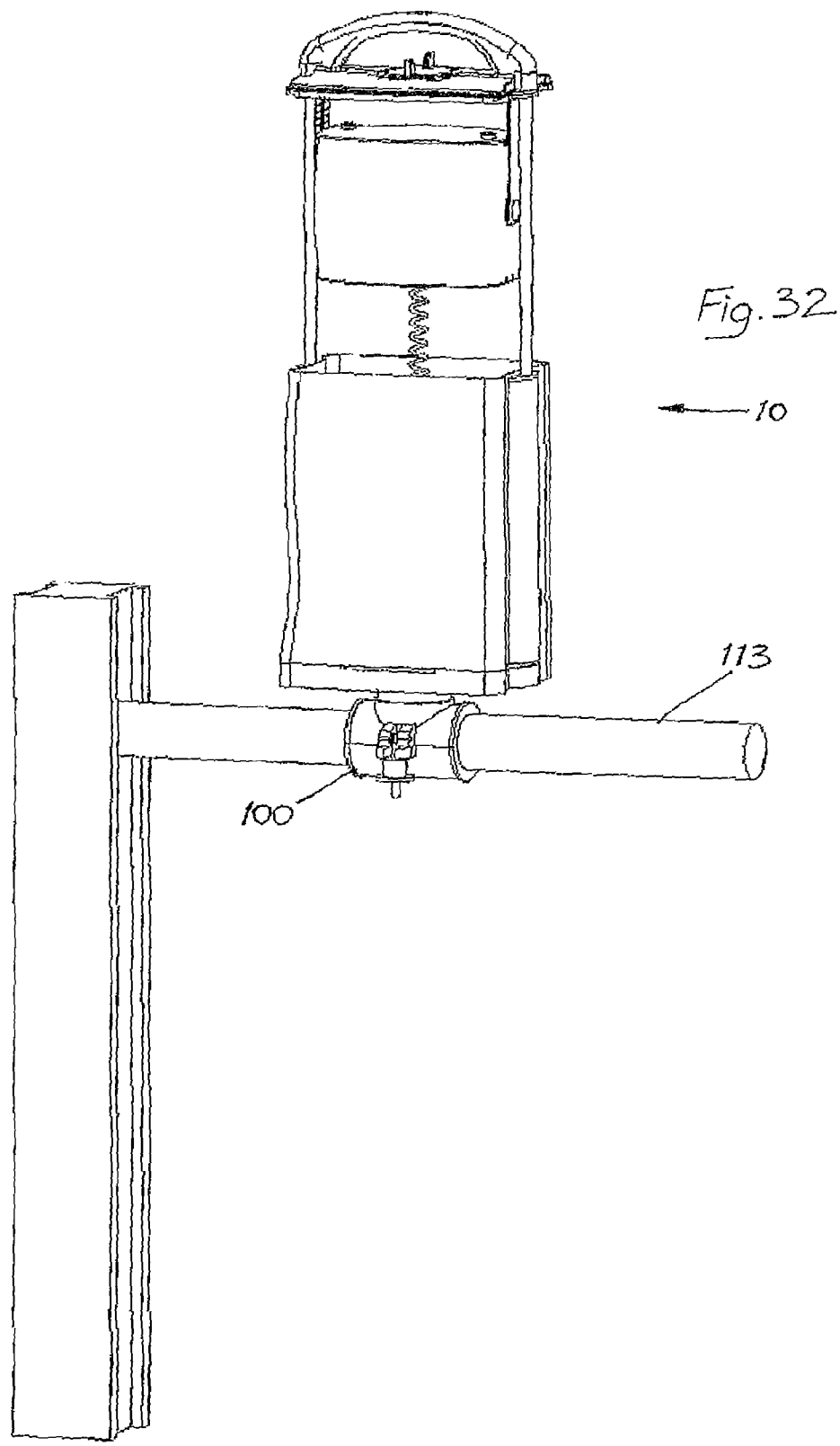
FIG. 32 is a front elevational view of the portable light assembly shown in FIG. 3 top mounted to a cylindrical, horizontally extending, component of a working pole with the use of the mounting clamp shown in FIGS. 26 to 29.

The mounting clamp 100 shown isolated in FIGS. 26 to 29 has a top mount plate 102 supported on a base 104. The base 104 extends upwardly from a top clamp arm 106 which cooperates with a bottom clamp arm 108. The top and bottom clamp arms 106, 108 are connected by a hinge assembly 110. There is an adjustable closure assembly 112 which may control the tightness of the closure of the clamp arms 106, 108 around, say, cylindrical, horizontally extending, components 113 of scaffolding or working poles used in the power industry. The top mount plate 102 has four mount holes 114 which are adapted to receive bolts or wing nuts 116 (see FIG. 30). The location of the wing nuts 116 corresponds to the screw mounting arrangement 82 at the underside of the pedestal 18 so that the wing nuts 116 can engage that arrangement 82 and so top mount the assembly 10 to the mounting clamp 100 (see FIGS. 31 and 32) in either a front on or sideways direction.

Figure 36:
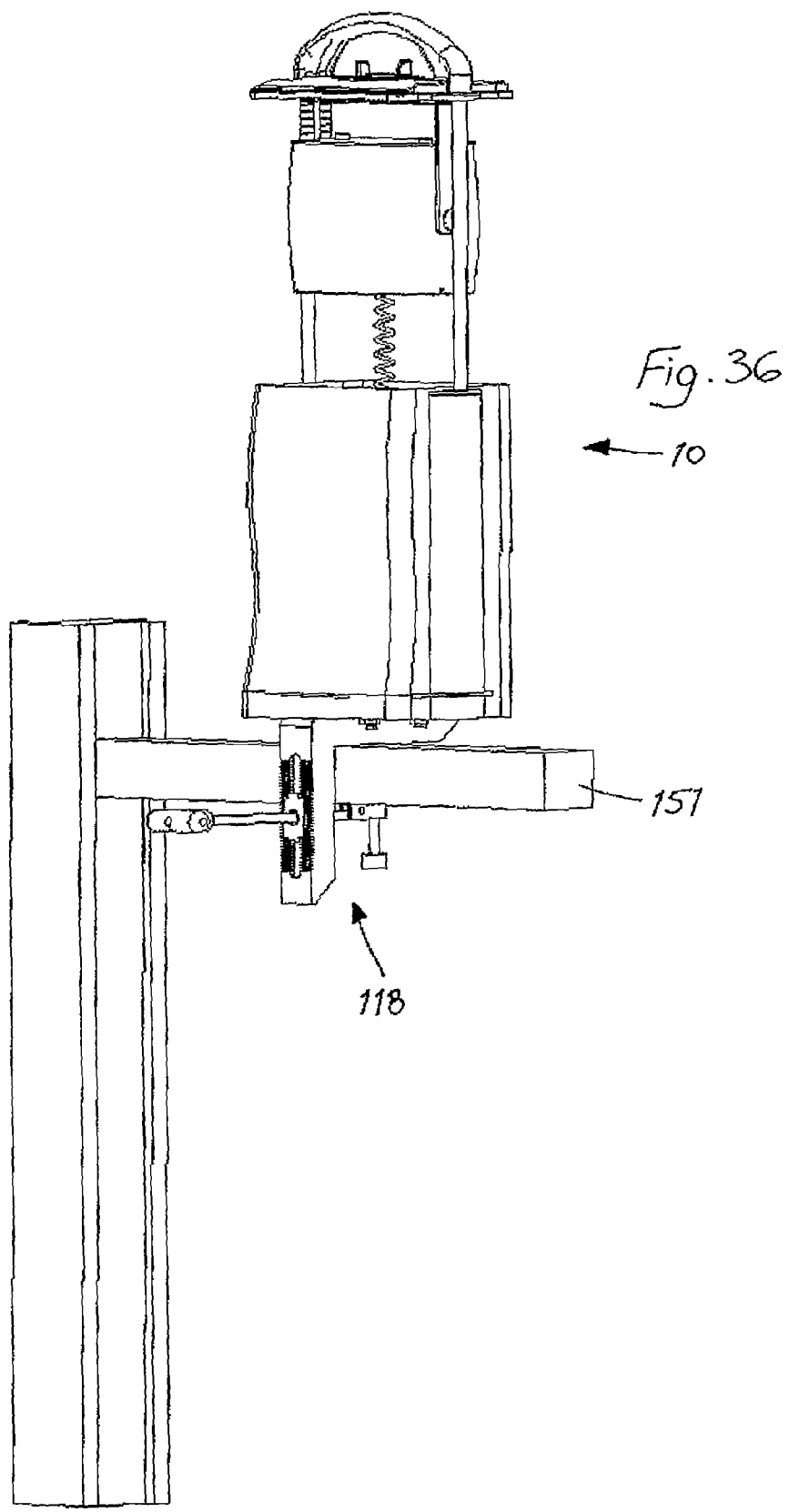
FIG. 36 is a front perspective view of the portable light assembly shown in FIG. 3 top mounted in a front on direction to working pole with the use of the adjustable mounting brackets shown in FIGS. 33 and 34.
Figure 37:
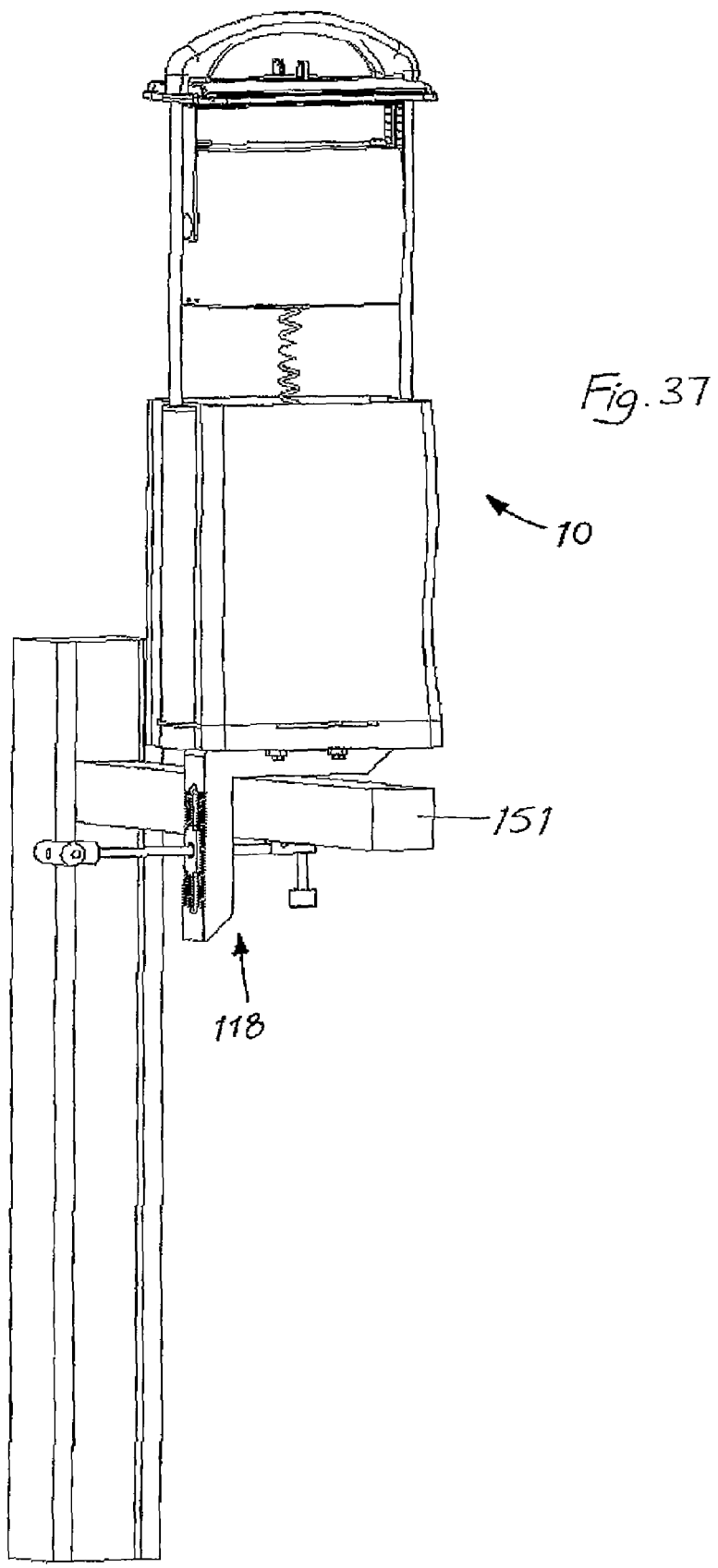
FIG. 37 is a front perspective view of the portable light assembly shown in FIG. 3 top mounted in a sideways direction to a working pole with the use of the adjustable mounting bracket shown in FIGS. 33 and 34.
Figure 38:
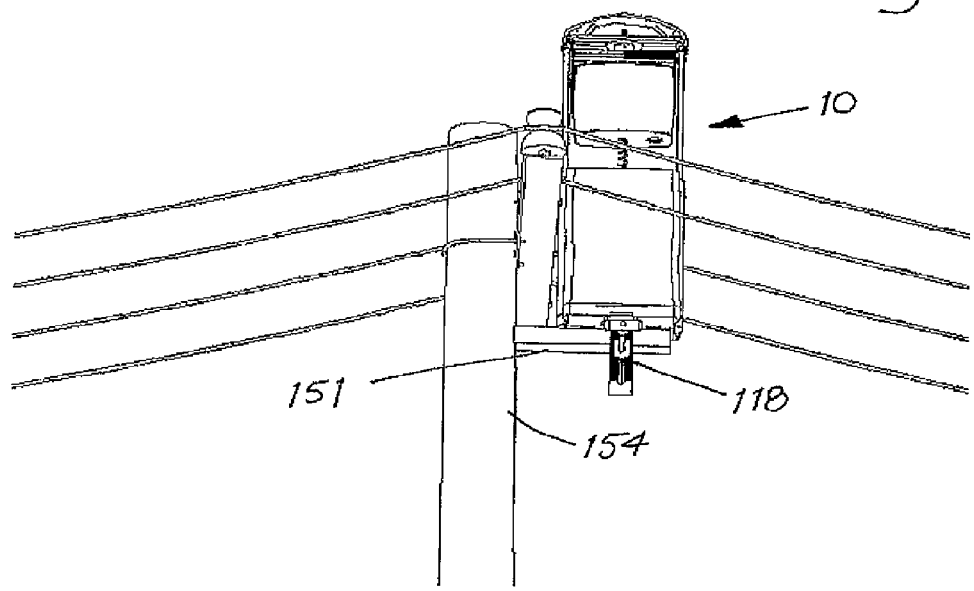
FIG. 38 is a bottom perspective view of the portable light assembly shown in FIG. 3 top mounted to a square cornered, horizontally extending, component of a telegraph pole with the use of the adjustable mounting brackets shown in FIGS. 33 and 34.
Figure 39:
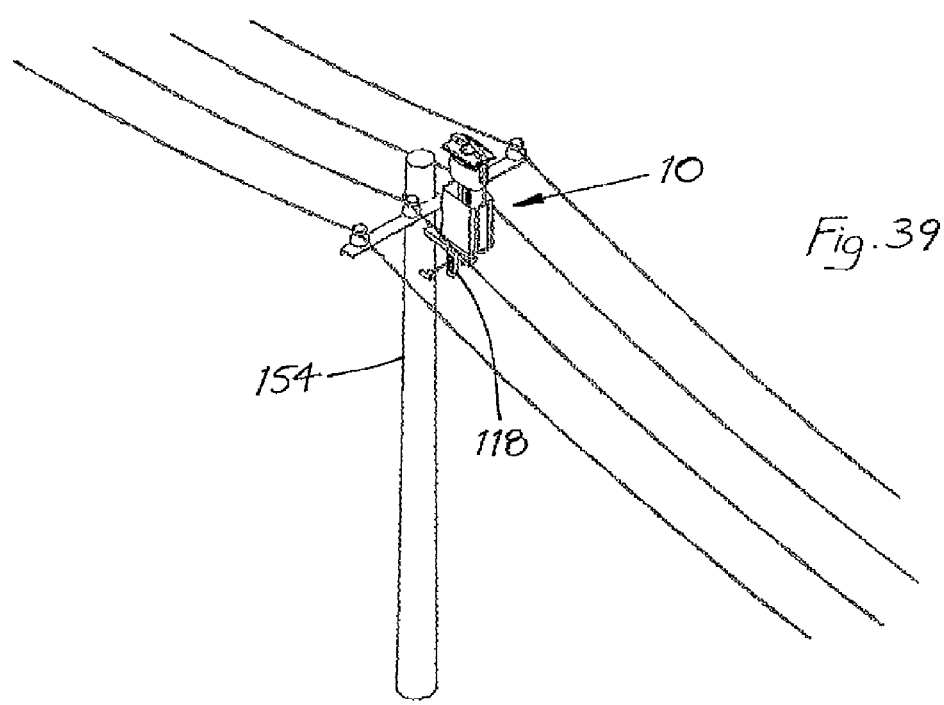
FIG. 39 is a top perspective view of the arrangement shown in FIG. 38.

The adjustable mounting bracket 118 shown isolated in FIGS. 33 and 34 has a top surface 120 defined by a cross arm 122 that is integrally connected to a side arm 124. There are four mount holes 126 formed in respective projections 128 from the top surface 120. A slide handle 130 has a carriage 132 that can slide vertically along a toothed track 134 formed on the side arm 124. There is a hand grip 136 at one end of the slide handle 130 and a variable clamping device 138 at the other end. The variable clamping device 138 has a ratcheted rod 140 that slidably engages a toothed surface within an upright portion 142 of a clamping square 144. There is an adjustment knob 146 at a lower end of the rod 140 and a carriage 148 at the upper end, the carriage 148 being slidable horizontally along a slotted track 150 supported beneath the cross arm 122. The adjustable mounting bracket 118 is able to receive a square cornered, horizontally extending component 151 of various dimensions of, say, a working pole in the space between the arms 122, 124 and the variable clamping device 138. The mount holes 126 are adapted to receive bolts 152 (see FIG. 35). The location of the bolts 152 corresponds to the screw mounting arrangement 82 at the underside of the pedestal 18 so that the bolts 152 can engage that arrangement 82 and so top mount the assembly 10 to the mounting bracket 118 (see FIGS. 36 and 37) in either a front on or sideways direction. FIGS. 38 and 39 show the assembly 10 mounted on a telegraph pole 154 with the use of the mounting bracket 118.

Figure 42:
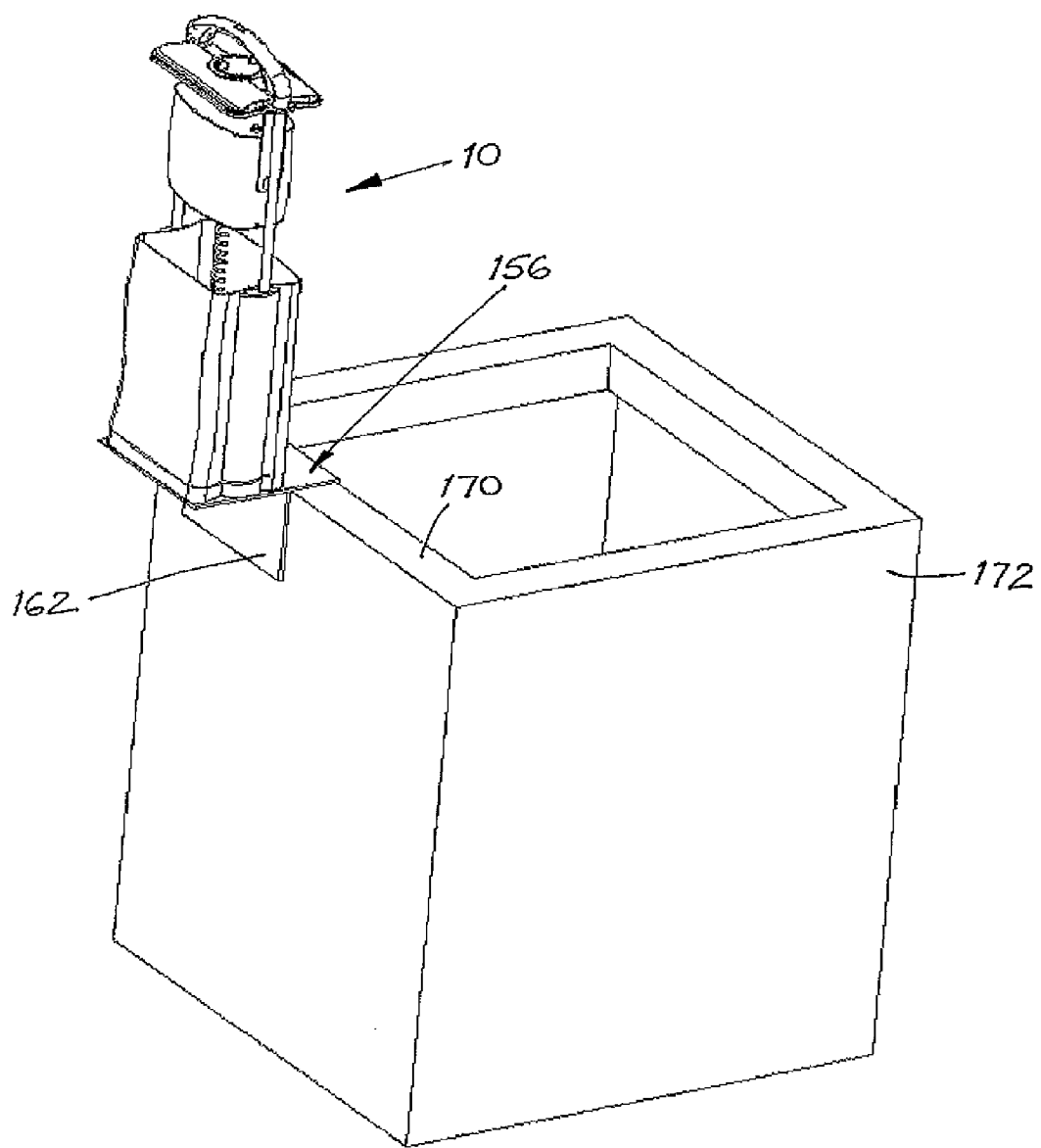
FIG. 42 is a front perspective view of the portable light assembly shown in FIG. 3 top mounted to a square cornered rim of a work basket with the use of the basket mounting bracket shown in FIG. 40.

The work basket mounting bracket 156 shown isolated in FIG. 40 has a top mount panel 158, a short side panel 160 and a longer central panel 162 extending downwardly from the top mount panel 158. There are four top mount holes 164 formed in respective protrusions 166 from the top mount panel 158, the mount holes 164 being adapted to receive bolts or wing nuts 168 (see FIG. 41). The location of the wing nuts 168 corresponds to the screw mounting arrangement 82 at the underside of the pedestal 18 so that the wing nuts 168 can engage that arrangement and so top mount the assembly 10 to the mounting bracket 156. The mounting bracket 156 can engage a square cornered rim 170 of a work basket 172 by fitting the rim 170 between the side and central panels 160, 162 (see FIG. 42).

Figure 43:
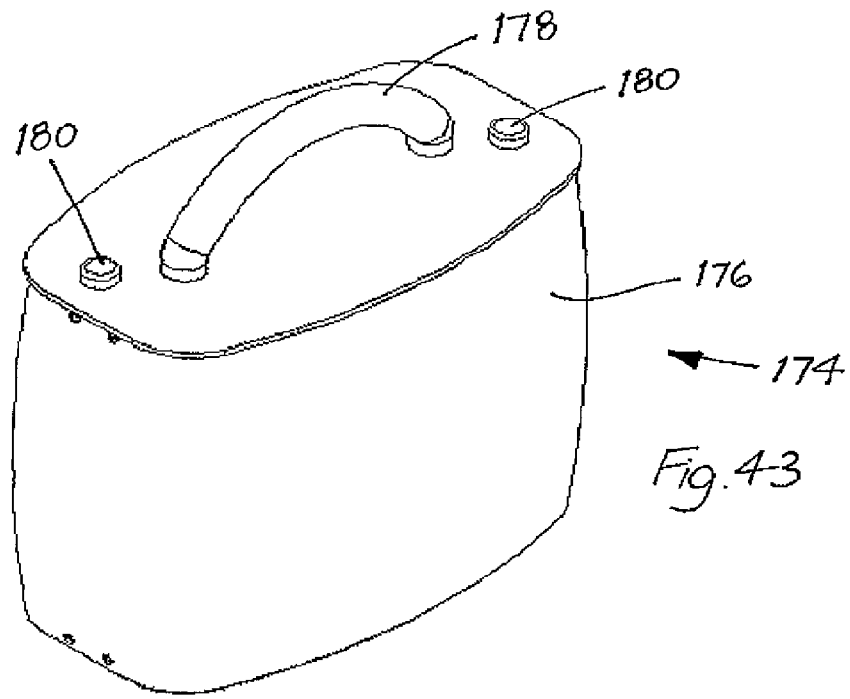
FIG. 43 is a front perspective view of a portable light assembly according to a second preferred embodiment of the invention, the assembly adapted to be connected by electric cabling to an external source of direct power.
Figure 44:
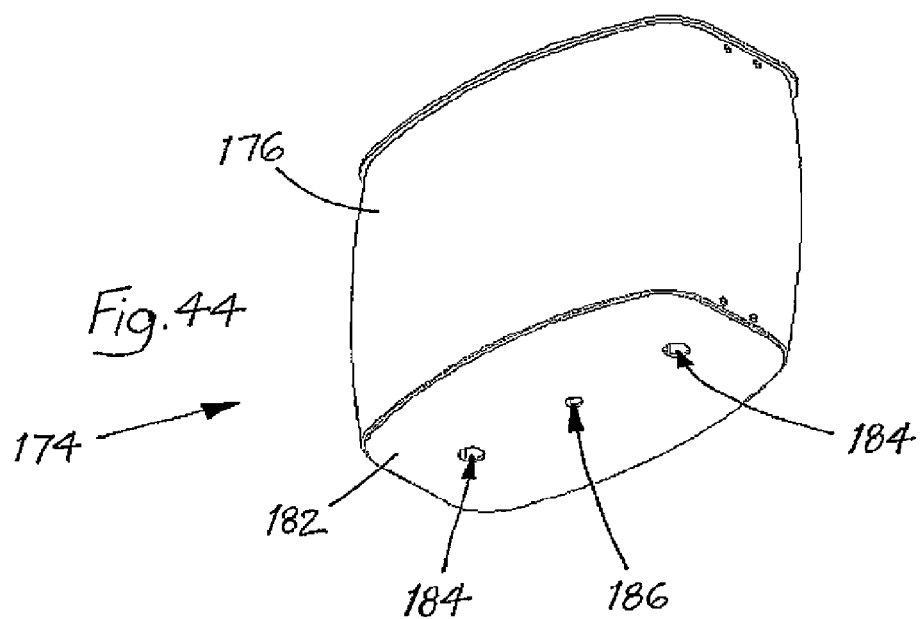
FIG. 44 is a bottom perspective view of the assembly shown in FIG. 43.

The portable light assembly 174 shown in FIGS. 43 and 44 has a light head 176 and a handle 178. There is a pair of on/off buttons 180 for operating the light tubes located inside the light head 176. The arrangement inside the light head 176 is similar to that inside the light head 26 described earlier. Through the base 182 is a pair of internal power access holes 184 for respective electrical cables to supply power to the light tubes. A central hole 186 is used for mounting the assembly 174 to a tripod 188 (see FIGS. 46 to 48).

Figure 45:
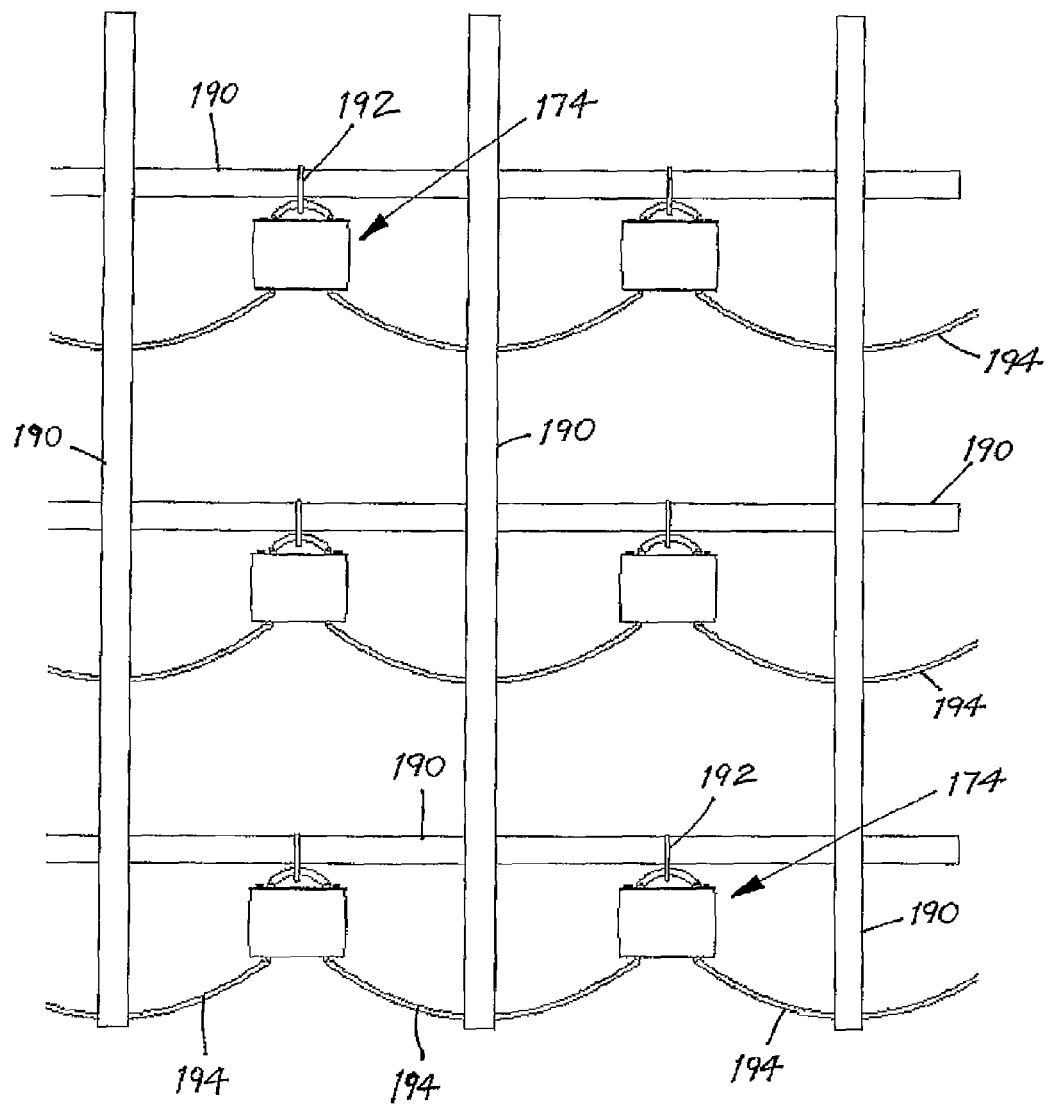
FIG. 45 is a front elevational view of six of the portable light assemblies shown in FIGS. 43 and 44 bottom mounted to scaffolding with the use of mounting rings, and connected by electric cabling to an external power generator.

FIG. 45 shows six of the assemblies 174 mounted to scaffolding 190 with the use of mounting rings 192. Electrical cables 194 supply internal power to the light tubes inside each of the assemblies 174.

Figure 46:
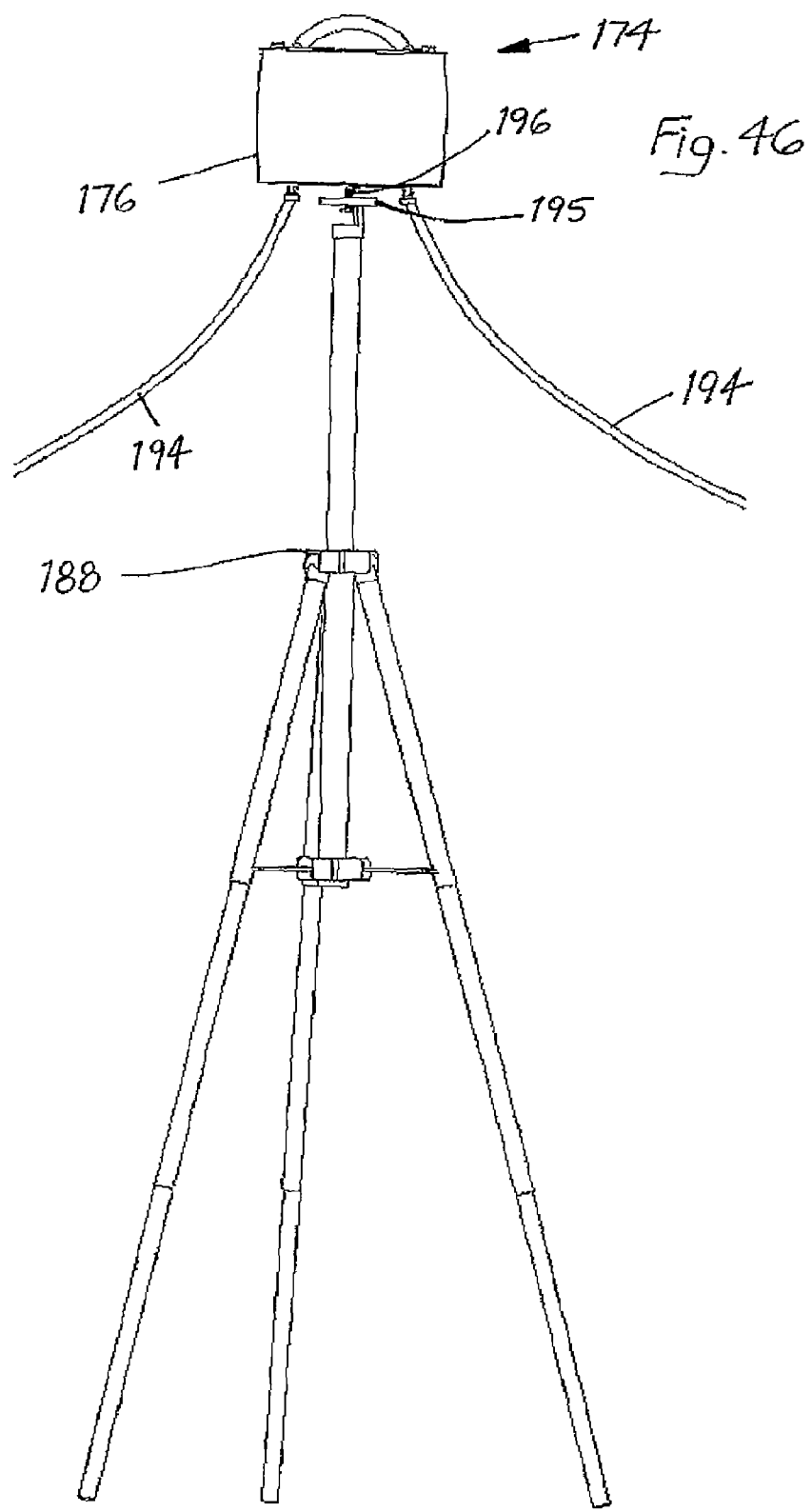
FIG. 46 is a front elevational view of the portable light assembly shown in FIGS. 43 and 44 top mounted to a tripod and connected by electric cabling to an external power generator.
Figure 47:
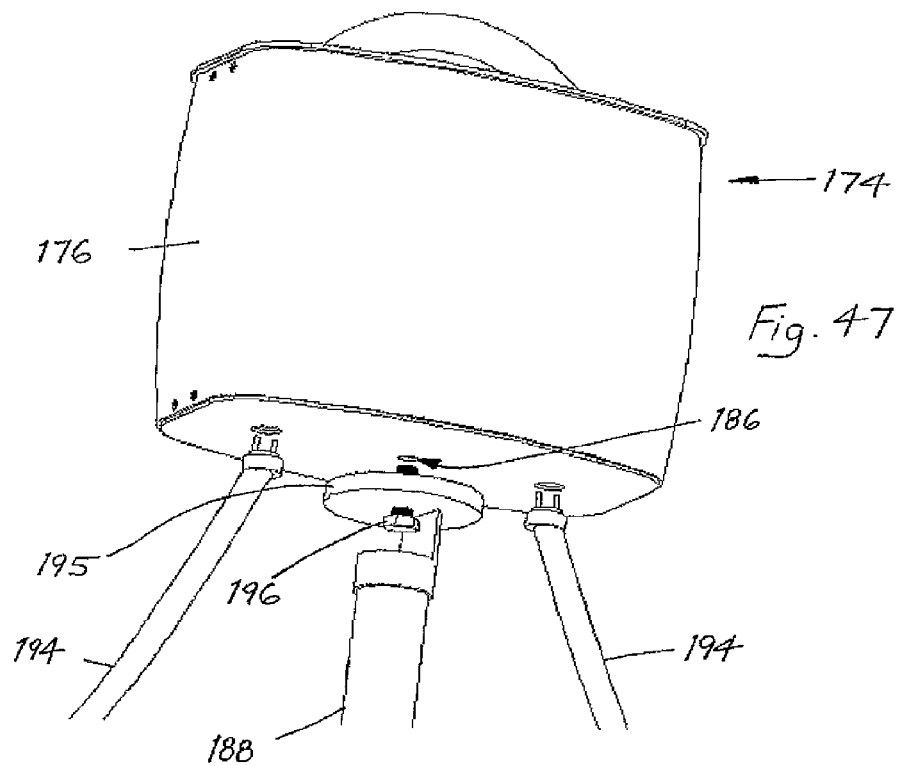
FIG. 47 is a bottom perspective view of the portable light assembly shown in FIG. 46 about to be mounted on a mounting table of the tripod, and about to be connected by electric cabling to an external power generator.
Figure 48:
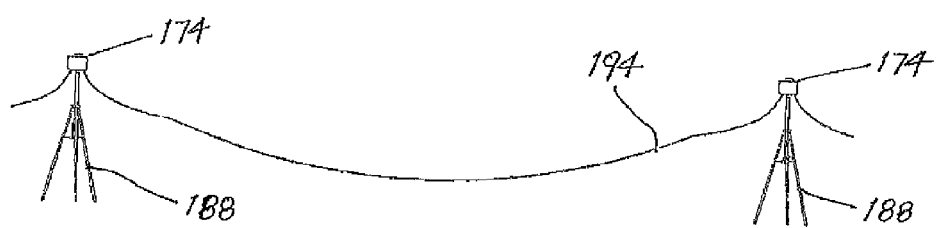
FIG. 48 is a front elevational view of two of the portable light assemblies shown in FIGS. 43 and 44 top mounted to respective tripods and connected by electric cabling to an external power generator.

The tripods 188 shown in FIGS. 46 to 48 are of a conventional structure but include an upper mounting table 195 with a mounting hole through which a bolt 196 can be received for engaging the central hole 186 of the light head 176. Top mounting the assembly 174 to ground supported tripods 188 enables a wide area of ground to be illuminated with power supplied by an external power generator.

Figure 49:
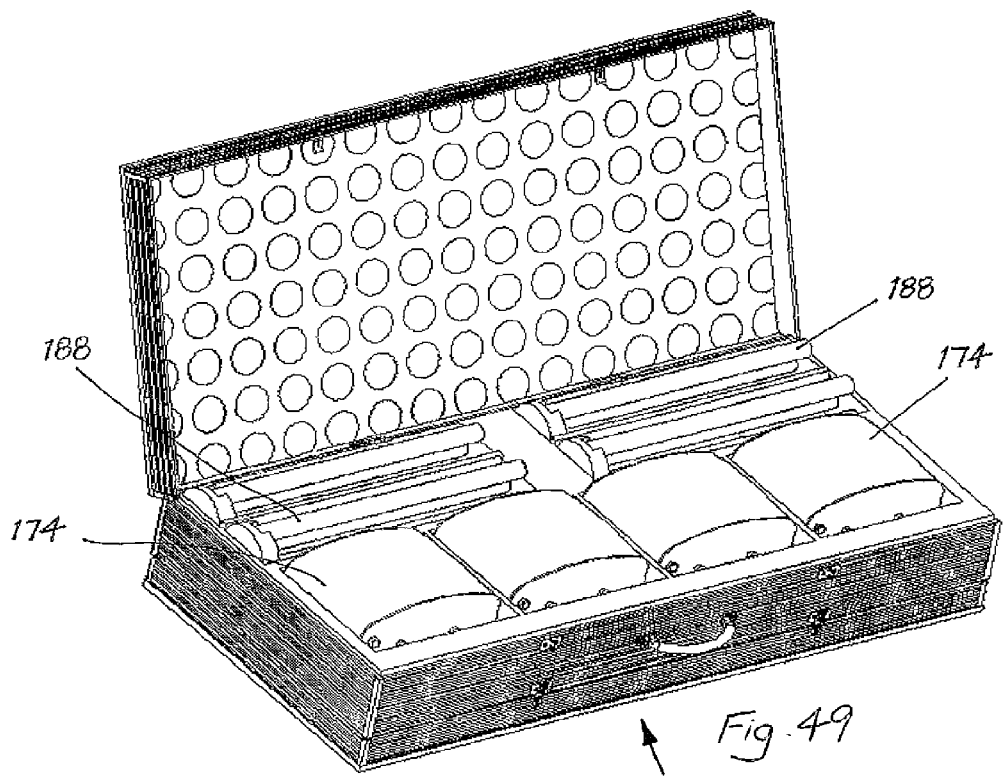
FIG. 49 is a front perspective view of a carry case for storing four of the portable light assemblies shown in FIGS. 43 and 44 and four of the tripods shown in FIG. 46.

Four of the assemblies 174 and four of the tripods 188 may be stored in a carry case 198 shown in FIG. 49.

Figure 50:
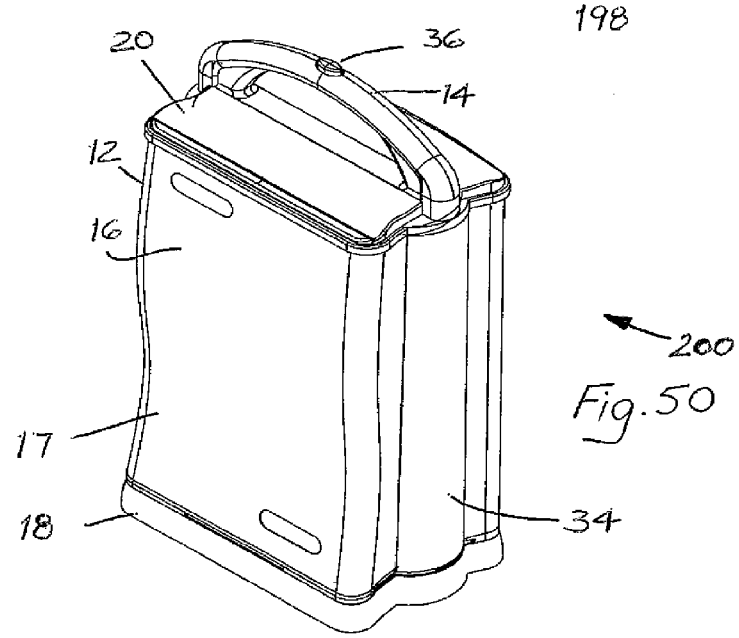
FIG. 50 is a front perspective view of a portable light assembly according to a third preferred embodiment of the invention when in a closed position, the assembly adapted to be connected directly to an internal battery housed within the assembly.
Figure 51:
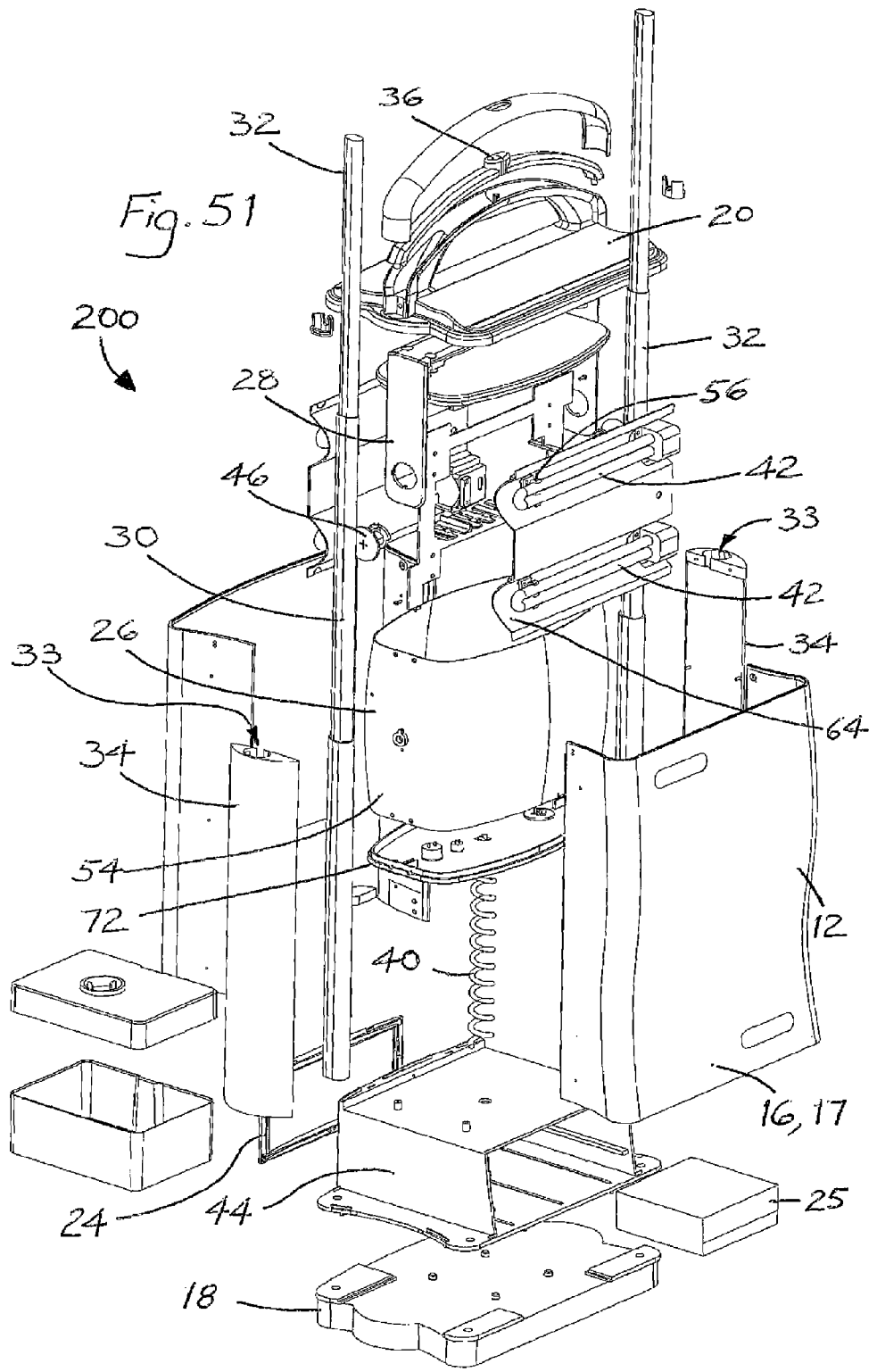
FIG. 51 is an exploded front perspective view of the assembly shown in FIG. 50.

The portable light assembly 200 shown in FIGS. 50 and 51 is similar to the portable light assembly 10, but does not include or require a rotation switch knob on the lid, nor an aperture in the lid through which the rotation switch knob can be fitted.

Otherwise, features of the portable light assembly 200 that are similar to features in the assembly 10 are identified by like numerals in FIGS. 50 and 51.

In this embodiment, the light tubes 42 are located in the light head 26.

Figure 52:
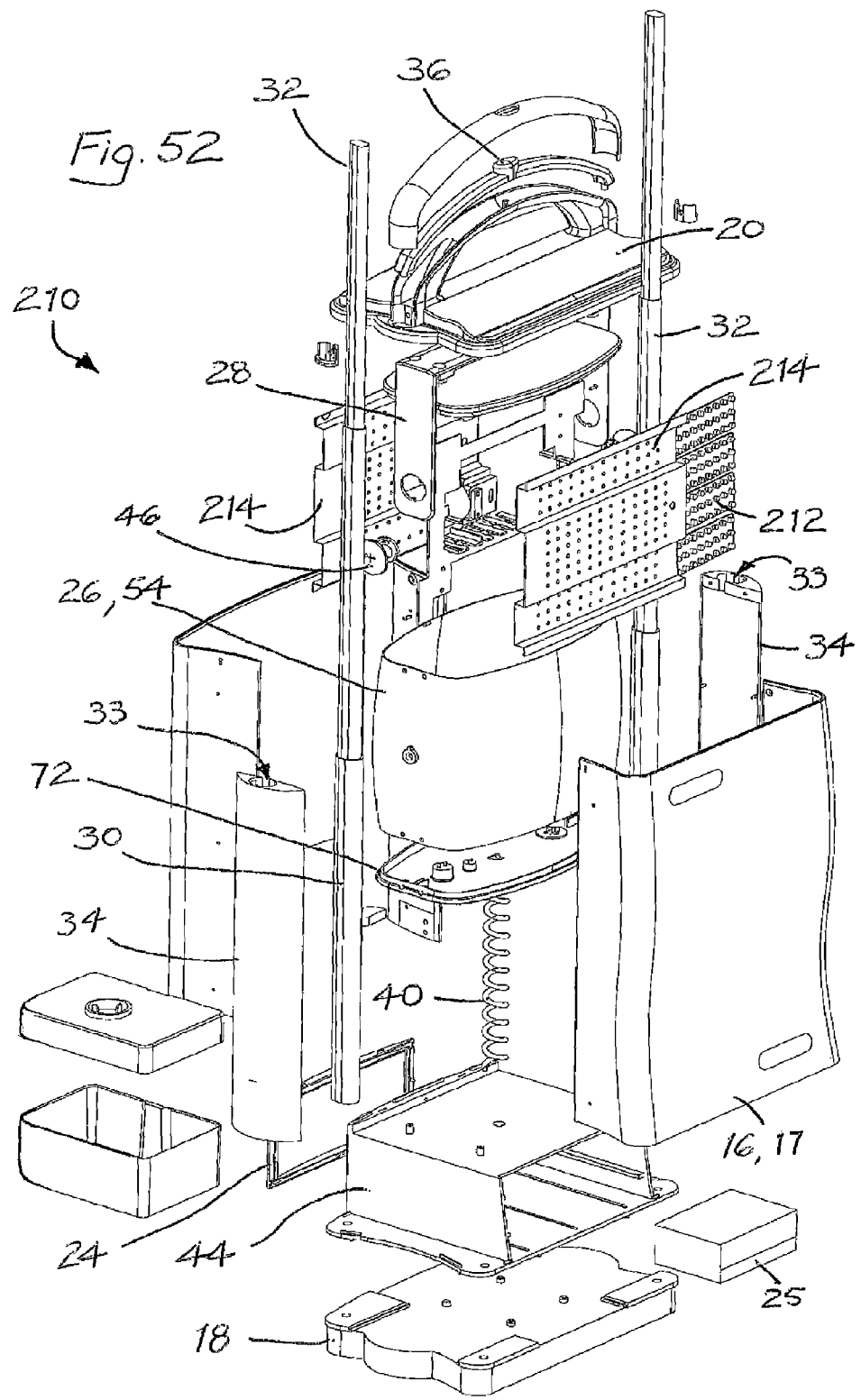
FIG. 52 is an exploded front perspective view of a portable light assembly according to a fourth preferred embodiment of the invention.

The portable light assembly 210 shown in FIG. 52 differs from the portable light assembly 200 only in that it has light emitting diodes (LEDs) 212 located on boards 214 in the light head 26. The electronic connections with the LEDs 212 are, of course, different to those with the light tubes 42.

In general, the assembly has an IP rating of 65 which allows it to be operated in all weather conditions, and has UV protective properties to prevent early structural deterioration, especially of the hood or casing.

It will be apparent to persons skilled in the art that various modifications may be made in details of design and construction of the portable light assembly described above without departing from the scope or ambit of the present invention.

The invention claimed is:

1. The portable light assembly comprising a light head adapted to be housed in a protective container and to be withdrawn therefrom when required for use, and a lid for closing the protective container, the light head being adapted to be connected to a battery also housed in the container, the portable light assembly including mounting means for supporting the light head at locations in need of illumination, wherein the light head is attached to the lid via a swivel bracket such that when the light head is withdrawn from the protective container the light head can rotate relative to the swivel bracket, the portable light assembly further including a handle extension that is withdrawn from the protective container when the light head is withdrawn, wherein the handle extension is attached to the lid, and the lid supports the swivel bracket, the handle extension having telescopic posts that can slide upwardly from the protective container and wherein a handle is connected to the lid, and the handle includes a means for releasing the handle extension from the protective container, whereby the handle extension, lid, swivel bracket and light head can be slid upwardly by activating the releasing means and lifting the handle.

2. The portable light assembly of claim 1 wherein the mounting means includes a screw mounting arrangement formed at the underside of the portable light assembly.

3. The portable light assembly of claim 1 wherein the mounting means further includes any one of a mounting plate, mounting bracket, mounting clamp and mounting ring.

4. The portable light assembly of claim 1 and further including an extendable electrical cable for supplying power from the battery to a light source inside the light head.

5. A portable light assembly comprising a light head adapted to be housed in a protective container and to be withdrawn therefrom when required for use, the light head being adapted to be connected to a battery also housed within the container, the portable light assembly including mounting means for supporting the light head at locations in need of illumination, wherein the mounting means is a base of the container on which the portable light assembly can stand and is adapted for releasable connection to at least one additional mounting, a lid for closing the protective container, a swivel mounting for attaching the light head to the lid such that when the light head is withdrawn from the protected container the light head can swivel relative to the lid, support posts telescopically mounted from the protective container and connected to the lid to guide and support the lid from a lowered position in which it closes the container with the light head enclosed therein and a raised position in which the light head is withdrawn from the container, a handle connected to the lid, releasable locking means for locking the lid and components attached thereto in the lowered position in which the lid closes the protective container, and release means for releasing the locking means whereby the lid can be drawn to its raised position by means of the handle to thereby withdraw the light head from the protective container when required for use.

6. A portable light assembly, comprising a protective container having a body and a lid for closing the container, a light head adapted to be housed within the closed protective container in a stored condition and to be withdrawn therefrom by opening the lid when required for use, the lid carrying the light head via a swivel mounting, a battery housed in the body of the container for powering the light head, and the container including mounting means for mounting the container at locations in need of illumination, wherein the mounting means is at a lower end of the container, the mounting means being a base on which the portable light assembly can stand and being adapted for releasable connection to at least one additional mounting, wherein the swivel mounting comprises a swivel bracket to which the light head is attached such that when the light head is withdrawn from the protective container by opening the lid, the light head can rotate relative to the swivel bracket about a substantially horizontal axis and the swivel bracket can rotate relative to the lid about a substantially vertical axis.

7. A portable light assembly, comprising a protective container having a body and a lid for closing the container, a light head adapted to be housed within the closed protective container in a stored condition and to be withdrawn therefrom by opening the lid when required for use, the lid carrying the light head via a swivel mounting, a battery housed in the body of the container for powering the light head, and the container including mounting means for mounting the container at locations in need of illumination, wherein the mounting means is at a lower end of the container, the mounting means being a base on which the portable light assembly can stand and being adapted for releasable connection to at least one additional mounting, wherein the lid includes a handle by which the lid with attached light head can be raised from the container body, the container further comprising means for guiding the lid for linear movement relative to the container body in a substantially vertical direction.

8. A portable light assembly according to claim 7, wherein the additional mounting comprises a tripod.

9. A portable light assembly according to claim 7, wherein the additional mounting comprises an adjustable mounting bracket.

10. A portable light assembly according to claim 7, wherein the additional mounting comprises a clamp for connection to scaffolding or a pole.

11. A portable light assembly according to claim 7, wherein the mounting means includes a screw mounting arrangement formed at the underside of the container.

12. A portable light assembly according to claim 11, wherein the mounting means further includes any one of a mounting plate, mounting bracket, mounting clamp and mounting ring.

13. A portable light assembly according to claim 7, wherein the guide means comprises posts attached to the lid and slidable telescopically relative to the body of the container.

14. A portable light assembly according to claim 13 further comprising locking means for retaining the lid in its closed position, the handle including release means actuable to release the locking means to permit the lid with light head to be raised into the condition for use.

15. A portable light assembly according to claim 7 further including an extendible electrical cable for supplying power from the battery to a light source inside the light head.

16. A portable light assembly according to claim 7, wherein the light source is a plurality of light tubes.

17. A portable light assembly according to claim 7, wherein the light source is a plurality of light emitting diodes.

* * * * *